US012804112B2

(12) United States Patent
Halevi et al.

(10) Patent No.: US 12,804,112 B2
(45) Date of Patent: Nov. 17, 2026

(54) REAL-TIME CORRECTION OF AGRICULTURAL-FIELD IMAGES

(71) Applicant: Centure Applications LTD, Tel Aviv (IL)

(72) Inventors: Yoav Halevi, Tel Aviv (IL); Assaf Zamir, Tel Aviv (IL); Alon Klein Orbach, Tel Aviv (IL); Israel Weiss, Tel Aviv (IL); Nir Erez, Tel Aviv (IL)

(73) Assignee: Centure Applications LTD, Tel Aviv-Jaffa (IL)

( * ) Notice: Subject to any disclaimer, the term of this patent is extended or adjusted under 35 U.S.C. 154(b) by 225 days.

(21) Appl. No.: 18/419,704

(22) Filed: Jan. 23, 2024

(65) Prior Publication Data

US 2024/0251065 A1 Jul. 25, 2024

Related U.S. Application Data

(60) Provisional application No. 63/481,250, filed on Jan. 24, 2023, provisional application No. 63/481,028, filed on Jan. 23, 2023.

(51) Int. Cl.
*H04N 9/73* (2023.01)
*A01N 25/00* (2006.01)
(Continued)

(52) U.S. Cl.
CPC ............... *H04N 9/73* (2013.01); *A01N 25/00* (2013.01); *G06V 10/56* (2022.01); *G06V 20/188* (2022.01); *H04N 23/88* (2023.01)

(58) Field of Classification Search
CPC .......... H04N 9/73; H04N 23/88; G06V 10/56; G06V 20/188; A01N 25/00
See application file for complete search history.

(56) References Cited

U.S. PATENT DOCUMENTS 9,148,995 B2 10/2015 Hrnicek et al.
10,255,670 B1 4/2019 Wu et al.
(Continued)

FOREIGN PATENT DOCUMENTS

EP 3866593 A1 8/2021
EP 4014734 A1 6/2022
(Continued)

OTHER PUBLICATIONS

Booker, "Technology Targets Spray Control", WEEDit, Blog, 4P., Mar. 22, 2018.

(Continued)

*Primary Examiner* — David F Dunphy
(74) *Attorney, Agent, or Firm* — Intrinsic Law Corp.

(57) ABSTRACT

An automated computer-implemented method for real-time correction of digital images. The method includes capturing an image of an agricultural field with a camera mounted on a spray boom of an agricultural spray system, the camera operably coupled to a computer in the agricultural spray system; estimating, with the computer, a spectral power distribution of the sun based on a date and a time that the image was captured; and correcting, with the computer, a white balance of the image based on the spectral power distribution of the sun and a camera response function of the camera, the camera response function stored in computer memory operably coupled to the computer.

9 Claims, 19 Drawing Sheets

(51) Int. Cl.

| | |
|---|---|
| ***G06V 10/56*** | (2022.01) |
| ***G06V 20/10*** | (2022.01) |
| ***H04N 23/88*** | (2023.01) |

(56) References Cited

U.S. PATENT DOCUMENTS

| | | | | |
|---|---|---|---|---|
| 11,393,049 | B2 | 7/2022 | Khait et al. | |
| 11,944,087 | B2 | 4/2024 | Mizushima et al. | |
| 12,356,977 | B2 | 7/2025 | Glasbrenner et al. | |
| 2011/0285842 | A1 | 11/2011 | Davenport et al. | |
| 2012/0237083 | A1 | 9/2012 | Lange et al. | |
| 2018/0330166 | A1 | 11/2018 | Redden et al. | |
| 2019/0064363 | A1 | 2/2019 | Redden et al. | |
| 2019/0095710 | A1* | 3/2019 | Rees | G06T 5/94 |
| 2019/0124827 | A1 | 5/2019 | Davis et al. | |
| 2019/0239502 | A1 | 8/2019 | Palomares et al. | |
| 2020/0011019 | A1 | 1/2020 | Serrat et al. | |
| 2020/0029490 | A1 | 1/2020 | Bertucci et al. | |
| 2020/0214281 | A1 | 7/2020 | Koch et al. | |
| 2020/0230633 | A1 | 7/2020 | Serrat et al. | |
| 2021/0103728 | A1 | 4/2021 | Young | |
| 2021/0149406 | A1 | 5/2021 | Javault et al. | |
| 2021/0365731 | A1 | 11/2021 | Takahashi et al. | |
| 2022/0092705 | A1* | 3/2022 | Khait | G06N 3/08 |
| 2022/0183208 | A1 | 6/2022 | Sibley et al. | |
| 2023/0043536 | A1* | 2/2023 | Herman | G06T 5/70 |
| 2023/0115704 | A1 | 4/2023 | Singh | |
| 2024/0188554 | A1 | 6/2024 | Link-Dolezal et al. | |
| 2024/0206452 | A1 | 6/2024 | Srinivasan et al. | |
| 2024/0224973 | A1 | 7/2024 | Serrat | |
| 2024/0253074 | A1 | 8/2024 | Rees et al. | |
| 2024/0253075 | A1 | 8/2024 | Hamblin et al. | |
| 2024/0257529 | A1 | 8/2024 | Rude et al. | |
| 2024/0260563 | A1 | 8/2024 | Klein Orbach et al. | |
| 2024/0265680 | A1 | 8/2024 | Klein Orbach et al. | |
| 2024/0276971 | A1 | 8/2024 | Zies et al. | |
| 2025/0000079 | A1* | 1/2025 | Collins | A01M 7/0096 |
| 2025/0072413 | A1 | 3/2025 | Simon et al. | |
| 2025/0093886 | A1 | 3/2025 | Bachman et al. | |
| 2025/0127156 | A1 | 4/2025 | Freudigmann et al. | |

FOREIGN PATENT DOCUMENTS

| | | | |
|---|---|---|---|
| WO | 2020049576 | A2 | 3/2020 |
| WO | 2022064482 | A1 | 3/2022 |
| WO | 2022172274 | A1 | 8/2022 |
| WO | 2024121669 | A1 | 6/2024 |

OTHER PUBLICATIONS

Klein et al., "Nozzles—Selection and Sizing", Cooperative Extension, Institute of Agriculture and Natural Resources, University of Nebraska—Lincoln, EC141, p. 1-10, 2011.

Wolf, "Optical Spot Spraying and Al Scouting", Sprayers 101, 12 P., Feb. 8, 2019.

International Search Report for PCT Application No. PCT/IL2021/051133, dated Dec. 22, 2021.

Dammer, K-H, and Do-Soon Kim, "Real-time Variable-rate Herbicide Application for Weed Control in Carrots." Weed research 56.3 (2016); 237-246, Web, (Year: 2016).

Somerville, G. J. et al., "Analysing the Number of Images Needed to Create Robust Variable Spray Maps." Precision Agriculture 22.5 (2021); 1377-1396, Web, (Year: 2021).

* cited by examiner

1400

1500

1600

REAL-TIME CORRECTION OF AGRICULTURAL-FIELD IMAGES

CROSS-REFERENCE TO RELATED APPLICATIONS

This application claims priority to U.S. Provisional Application No. 63/481,028, titled "Real-Time Correction of Agricultural Field Images," filed on Jan. 23, 2023, and to U.S. Provisional Application No. 63/481,250, titled "Real-Time Color Correction of Outdoor Images Acquired at High Frames Per Second," filed on Jan. 24, 2023, which are hereby incorporated by reference.

TECHNICAL FIELD

This application relates generally to the real-time correction of images.

BACKGROUND

The colors represented in images of an agricultural field can vary over the day and throughout the year based on the angle of the sun. Conventional color correction methods require large processing power and time latencies which are impractical for high frames-per-second (FPS) image acquisition and use algorithms without considering the sun position and date that result in less accurate color calibration.

In addition, images acquired by cameras or other image sensors can include geometric and/or radial distortion. Geometric distortion can be caused by the tilt angle of the camera with respect to the agricultural field. Radial distortion can be caused by the camera lens.

SUMMARY

Example embodiments described herein have innovative features, no single one of which is indispensable or solely responsible for their desirable attributes. The following description and drawings set forth certain illustrative implementations of the disclosure in detail, which are indicative of several exemplary ways in which the various principles of the disclosure may be carried out. The illustrative examples, however, are not exhaustive of the many possible embodiments of the disclosure. Without limiting the scope of the claims, some of the advantageous features will now be summarized. Other objects, advantages, and novel features of the disclosure will be set forth in the following detailed description of the disclosure when considered in conjunction with the drawings, which are intended to illustrate, not limit, the invention.

An aspect of the invention is directed to an automated computer-implemented method for real-time white-balance correction of digital images, comprising: capturing an image of an agricultural field with a camera mounted on a spray boom of an agricultural spray system, the camera operably coupled to a computer in the agricultural spray system; estimating, with the computer, a spectral power distribution of the sun based on a date and a time that the image was captured; and correcting, with the computer, a white balance of the image based on the spectral power distribution of the sun and a camera response function of the camera, the camera response function stored in computer memory operably coupled to the computer.

In one or more embodiments, the computer-implemented method further comprises producing light with a light source mounted on the spray boom, the light produced while capturing the image, the light source operably coupled to the computer; and correcting, with the computer, the white balance of the image based on the spectral power distribution of the sun, a spectral power distribution of the light source, and the camera response function of the camera, the spectral power distribution of the light source stored in the computer memory. In one or more embodiments, the computer-implemented method further comprises after correcting the white balance of the image: automatically analyzing, with a trained machine-learning (ML) model running on the computer, a white-balance corrected image for a presence of at least one weed, the trained ML model having been trained with first and second training images of agricultural fields, the first training images including one or more target weeds, the second training images not including the one or more target weeds; automatically detecting, with the computer, the at least one weed in the white-balance corrected image; and automatically selectively spraying one or more of the respective regions of the agricultural field using one or more selective-spray nozzles associated with the white-balance corrected image where the at least one weed is detected, the one or more selective-spray nozzles fluidly coupled to a container holding one or more herbicides.

In one or more embodiments, estimating the spectral power distribution of the sun includes querying the computer memory. In one or more embodiments, the computer-implemented method further comprises querying a database or a look-up table stored in the computer memory.

Another aspect of the invention is directed an automated computer-implemented method for real-time color correction of digital images, comprising: capturing calibration images of a color checker in an outside environment with a camera operably coupled to a computer, the images captured at different times of a day, the color checker including grids of different colors having known red-green-blue (RGB) values, the known RGB values determined when the color checker was illuminated with light having a predetermined spectral power distribution; determining, with the computer, color-correction matrices (CCMs) for the respective calibration images using the known RGB values of each color in the color checker; calculating, with the computer, an average CCM; and storing the average CCM in a memory module in or operably coupled to the computer.

In one or more embodiments, the computer-implemented method further comprises producing light with a light source while capturing each calibration image, the light source operably coupled to the computer. In one or more embodiments, a first group of the calibration images are captured during the daytime and a second group of the calibration images are captured during the nighttime. In one or more embodiments, the calibration images are captured on different days of a year.

In one or more embodiments, the computer-implemented method further comprises capturing an agricultural-field image with the camera; and color correcting the agricultural-field image, with the computer, using the average CCM. In one or more embodiments, the computer-implemented method further comprises after color correcting the agricultural-field image: automatically analyzing, with a trained machine-learning (ML) model running on the computer, a color-corrected agricultural-field image for a presence of at least one weed, the trained ML model having been trained with first and second training images of agricultural fields, the first training images including one or more target weeds, the second training images not including the one or more target weeds; automatically detecting, with the computer, the at least one weed in the color-corrected agricultural-field image; and automatically selectively spraying one or more of the respective regions of the agricultural field using one or more selective-spray nozzles associated with the color-corrected agricultural-field image where the at least one weed is detected, the one or more selective-spray nozzles fluidly coupled to a container holding one or more herbicides.

Another aspect of the invention is directed to an automated computer-implemented method for correcting a distortion of digital images in real time, comprising: placing an object of known size and geometry in a field of view of a camera; defining physical coordinates of multiple points of the object; capturing images of the object while the camera is in different positions and/or different angles with respect to the object; determining image coordinates of the multiple points of the object in each captured image; and determining image-correction parameters for the camera using the image coordinates for each image and the physical coordinates.

In one or more embodiments, the image-correction parameters correct for radial distortion and/or for geometric distortion of the images. In one or more embodiments, the computer-implemented method further comprises capturing an agricultural-field image with the camera; and correcting one or more distortions in the agricultural-field image, with the computer, using the image-correction parameters. In one or more embodiments, the correcting step includes translating and/or stretching the agricultural-field image according to the image-correction parameters.

In one or more embodiments, the computer-implemented method further comprises after correcting one or more distortions in the agricultural-field image: automatically analyzing, with a trained machine-learning (ML) model running on the computer, a distortion-corrected agricultural-field image for a presence of at least one weed, the trained ML model having been trained with first and second training images of agricultural fields, the first training images including one or more target weeds, the second training images not including the one or more target weeds; automatically detecting, with the computer, the at least one weed in the distortion-corrected agricultural-field image; and automatically selectively spraying one or more of the respective regions of the agricultural field using one or more selective-spray nozzles associated with the distortion-corrected agricultural-field image where the at least one weed is detected, the one or more selective-spray nozzles fluidly coupled to a container holding one or more herbicides.

BRIEF DESCRIPTION OF THE DRAWINGS

For a fuller understanding of the nature and advantages of the concepts disclosed herein, reference is made to the detailed description of preferred embodiments and the accompanying drawings.

DETAILED DESCRIPTION

Figure 1:
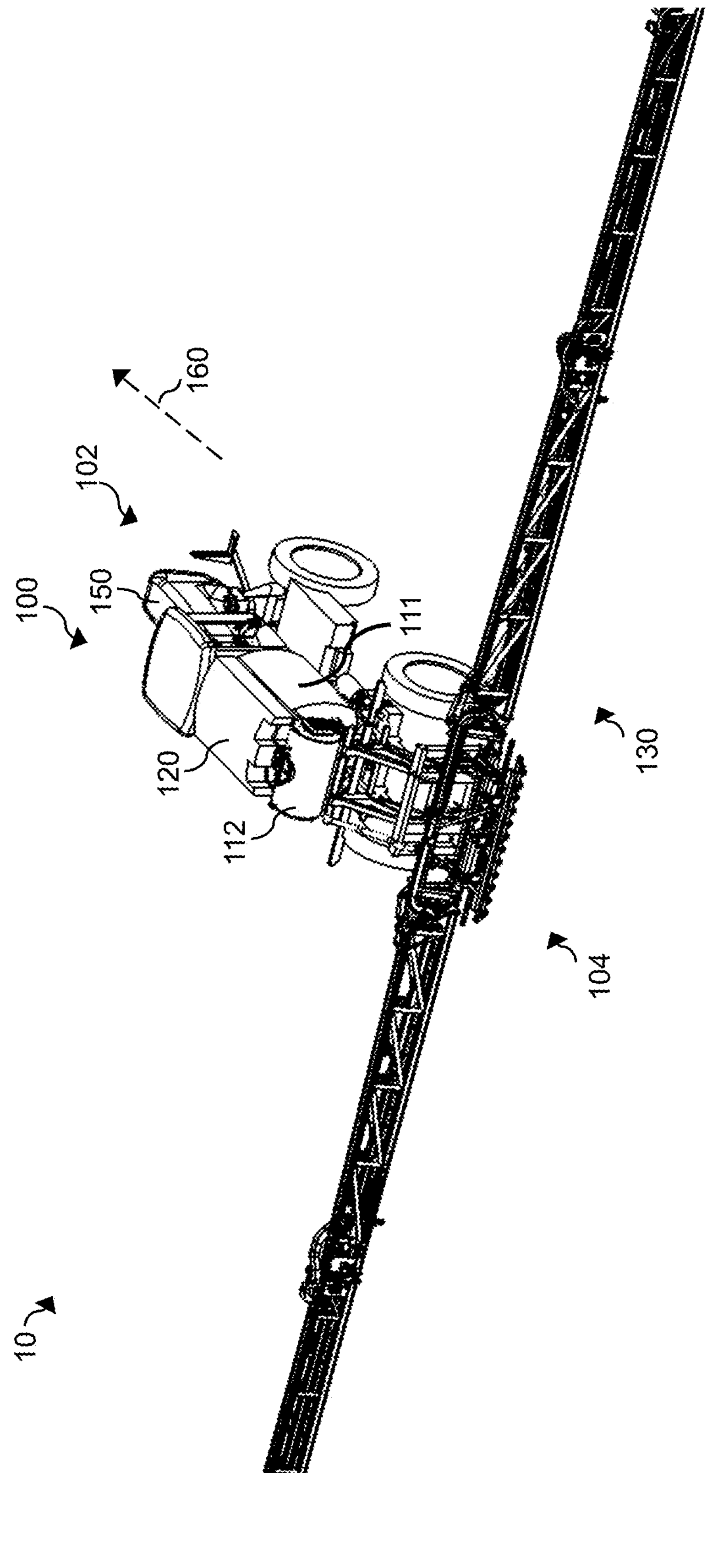
FIG. 1 is an isometric view of a selective sprayer system according to an embodiment.

FIG. 1 is an isometric view of a selective sprayer system 10 according to an embodiment. The system 10 includes an agricultural vehicle 100, an optional broadcast tank 111, a selective spot spray (SSP) tank 112, a rinse tank 120, and a spray boom 130.

The optional broadcast tank 111 is mounted on the agricultural vehicle 100 and is configured to hold one or more general-application liquid chemicals (e.g., herbicides) to be sprayed broadly onto an agricultural field using the spray boom 130, which is attached (e.g., releasably attached) to the agricultural vehicle 100. The broadcast liquid chemicals are configured to prevent weeds and/or other undesirable plants from growing. One or more first fluid lines fluidly couple the broadcast tank 111 to broadcast nozzles on the spray boom 130.

The SSP tank 112 is mounted on the agricultural vehicle 100 and is configured to hold one or more target-application or specific chemical(s) (e.g., herbicide(s)) that is/are designed to target one or more weeds growing in the agricultural field. One or more second fluid lines fluidly couple the SSP tank to SSP nozzles on the spray boom 130. The specific chemical(s) in the SSP tank 112 are selectively sprayed using the SSP nozzles in response to imaging of the agricultural field and analysis/detection by one or more trained machine learning models or image processing algorithms. The images of the agricultural field are acquired by an array of cameras or other image sensors that are mounted on the spray boom 130. Valves coupled to the SSP nozzles can be opened and closed to selectively spray the detected weeds.

The rinse tank 120 is fluidly coupled to the broadcast tank 111 and to the SSP tank 112. Water and/or another liquid stored in the rinse tank 120 can be used to rinse the broadcast tank 111 and the SSP tank 112 after each tank 111, 112 is emptied.

The engine 150 for the agricultural vehicle 100 can be replaced with a motor when the agricultural vehicle 100 is electric or can include both an engine and a motor when the agricultural vehicle 100 is a hybrid vehicle. In any case, the agricultural vehicle 100 includes a mechanical drive system that powers the agricultural vehicle 100 and the wheels.

The spray boom 130 is attached to the back 104 of the agricultural vehicle 100 in a first configuration of the system 10 such that the agricultural vehicle 100 pulls the spray boom 130 as the agricultural vehicle 100 drives forward (e.g., in direction 160). In a second configuration of the system 10, the spray boom 130 can be attached to the front 102 of the agricultural vehicle 100 such that the agricultural vehicle 100 pushes the spray boom 130 as the agricultural vehicle 100 drives forward.

Figure 2:
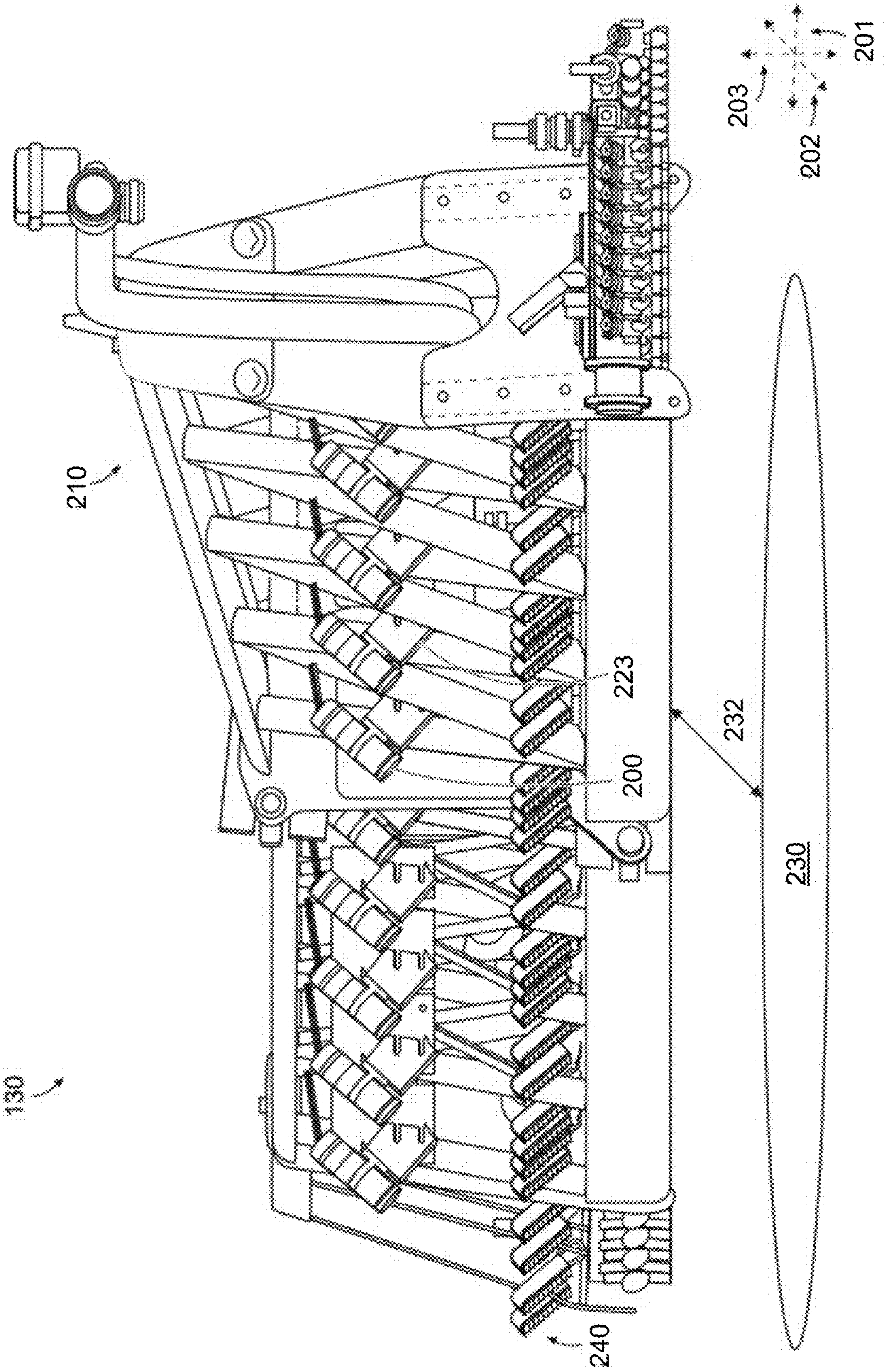
FIG. 2 is an isometric end view of the spray boom illustrated in FIG. 1 according to an embodiment.

FIG. 2 is an isometric end view of the spray boom 130 according to an embodiment. A plurality (e.g., an array) of cameras 200 or other image sensors are attached to the spray boom 130. Each camera 200 can be mounted on and/or attached to a respective camera frame 210.

The distance between neighboring camera frames 210 and respective cameras 200 (e.g., as measured with respect to a first axis 201) can be optimized according to a predetermined angle of the cameras 200 (e.g., relative to a third axis 203) and the respective field-of-views (FOVs) of the cameras 200 such that an overall FOV 230 of the cameras 200 is continuous at a predetermined distance 232 from the spray boom 130, the distance 232 measured along or with respect to a second axis 202, where axes 201-203 are mutually orthogonal.

A housing 220 can be mounted or attached to some or each camera frame(s) 210. The housing 220 is configured to protect one or more electrical components located in the housing 220. The electrical components can include one or more processors, computer memory (e.g., storing trained machine-learning models), power supplies, analog-to-digital converters, digital-to-analog converters, amplifiers, and/or other electrical components. The electrical components in the housing 220 are in electrical communication with and/or electrically coupled to one or more cameras 200 and one or more illumination sources 240.

Multiple (e.g., an array of) illumination sources 240 are mounted on the spray boom 130. The illumination sources 240 can be positioned between neighboring cameras 200 and/or between neighboring camera frames 210. The illumination sources 220 can provide broad-spectrum or narrow-spectrum light. The illumination sources 220 are configured to provide uniform (or substantially uniform) lighting within the field of view of the cameras 200 when images are acquired. The illumination sources 220 can be evenly spaced along the length of the spray boom 130 (e.g., with respect to the first axis 201). The illumination sources 220 can comprise light-emitting diodes (LEDs), light pipes (e.g., optical fibers optically coupled to LEDs or other lights), lasers, incandescent lights, and/or other lights.

Figure 3:
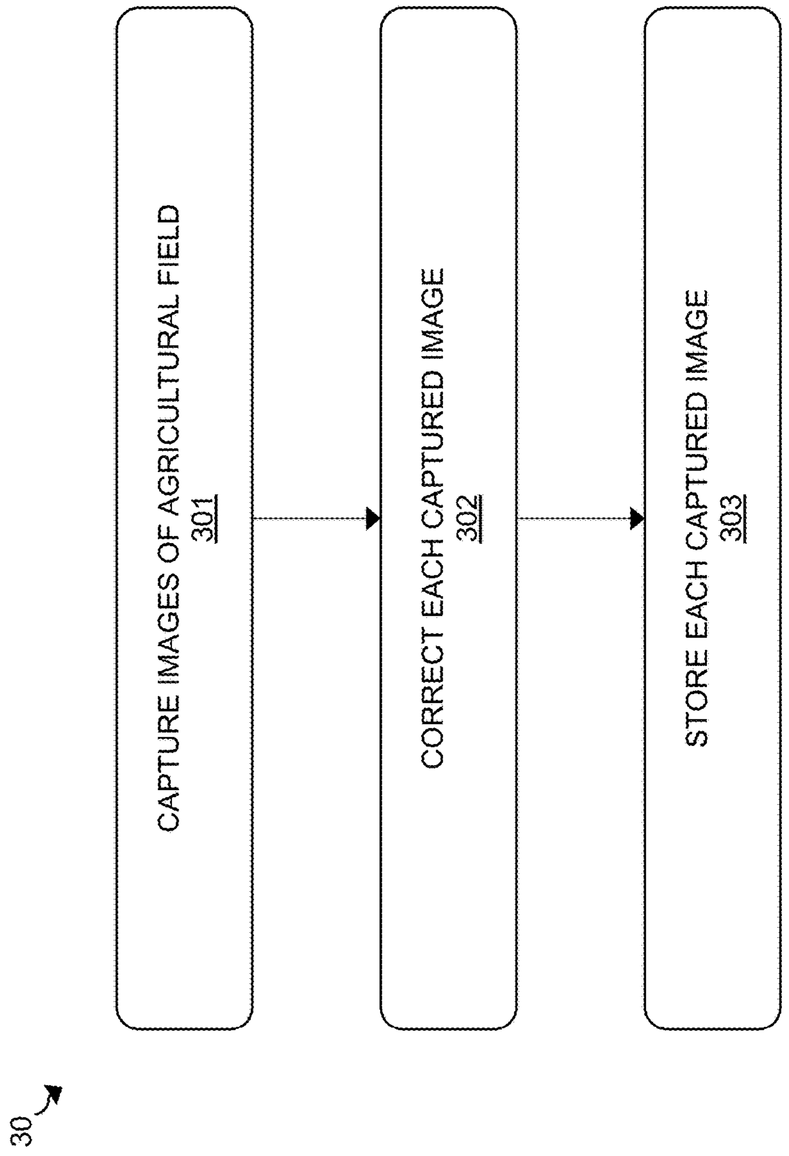
FIG. 3 is a flow chart of a method for real-time correcting of images of an agricultural field according to an embodiment.

FIG. 3 is a flow chart of a method 30 for real-time correcting of images of an agricultural field according to an embodiment. In step 301, images of an agricultural field are captured using the cameras 200 on the spray boom 130. The images can be captured while lighting is provided by the illumination sources 220.

In step 302, each image is corrected. Correcting the images can include correcting for white balance of the image, color correcting the image, and/or correction for image distortion. The image correction is performed by one or more processors, such as one or more graphics processing unit (GPUs) and/or one or more central processing units (CPUs) that is/are operably coupled to one or more cameras 200.

In optional step 303, each corrected image is stored in computer memory that is operably coupled to the processor (s). The computer memory can include random access memory (RAM) and/or non-volatile memory such as a solid-state storage (SSD) device.

Figure 4:
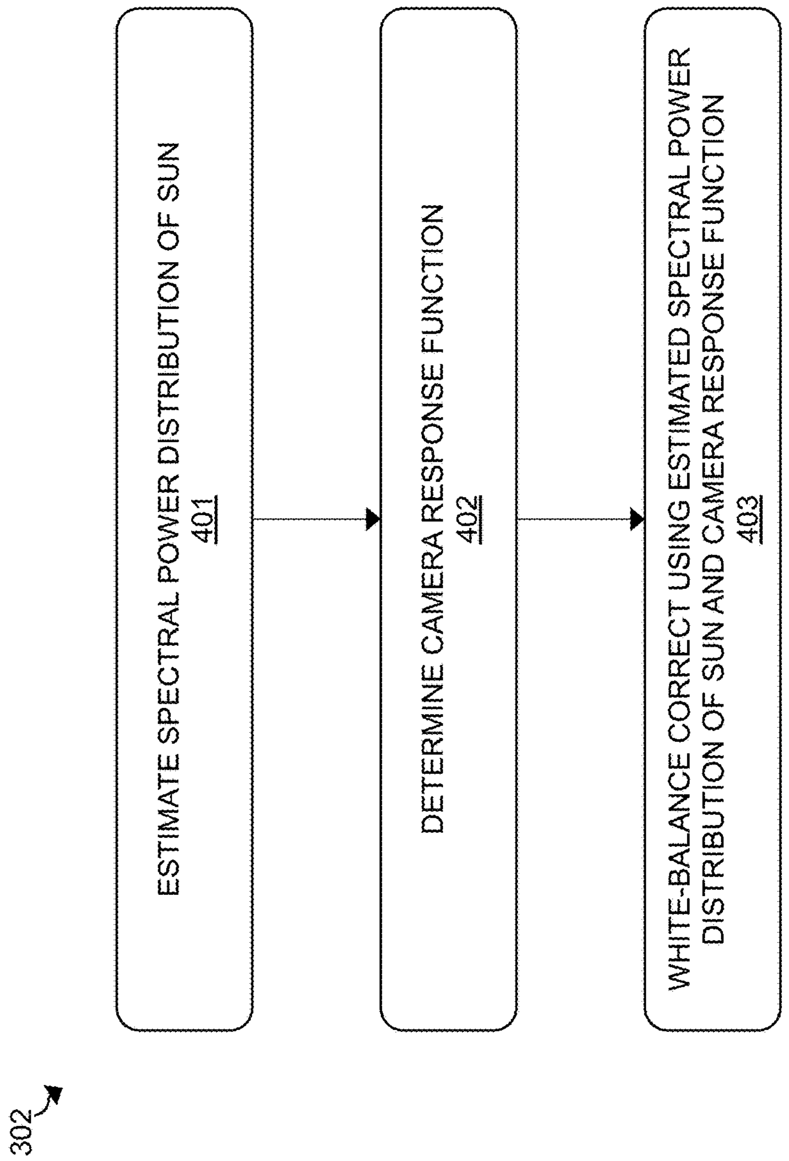
FIG. 4 is a flow chart of the correcting step in FIG. 3 for white-balance correction of an image according to an embodiment.

FIG. 4 is a flow chart the correcting step 302 for white-balance correction of an image.

In step 401, the spectral power distribution (SPD) of the sun is estimated. The SPD is the distribution of the energy levels of a light source through a range of wavelengths of light, which can be represented in a graph. The SPD is the true "fingerprint" of a light source, as it is the key to how the light source renders colors. The energy levels of a light source are the spectral irradiance $$\left(\frac{W}{m^2 nm}\right).$$

The SPD of the sun can be estimated based on the time and date that the image is acquired.

Figure 5:
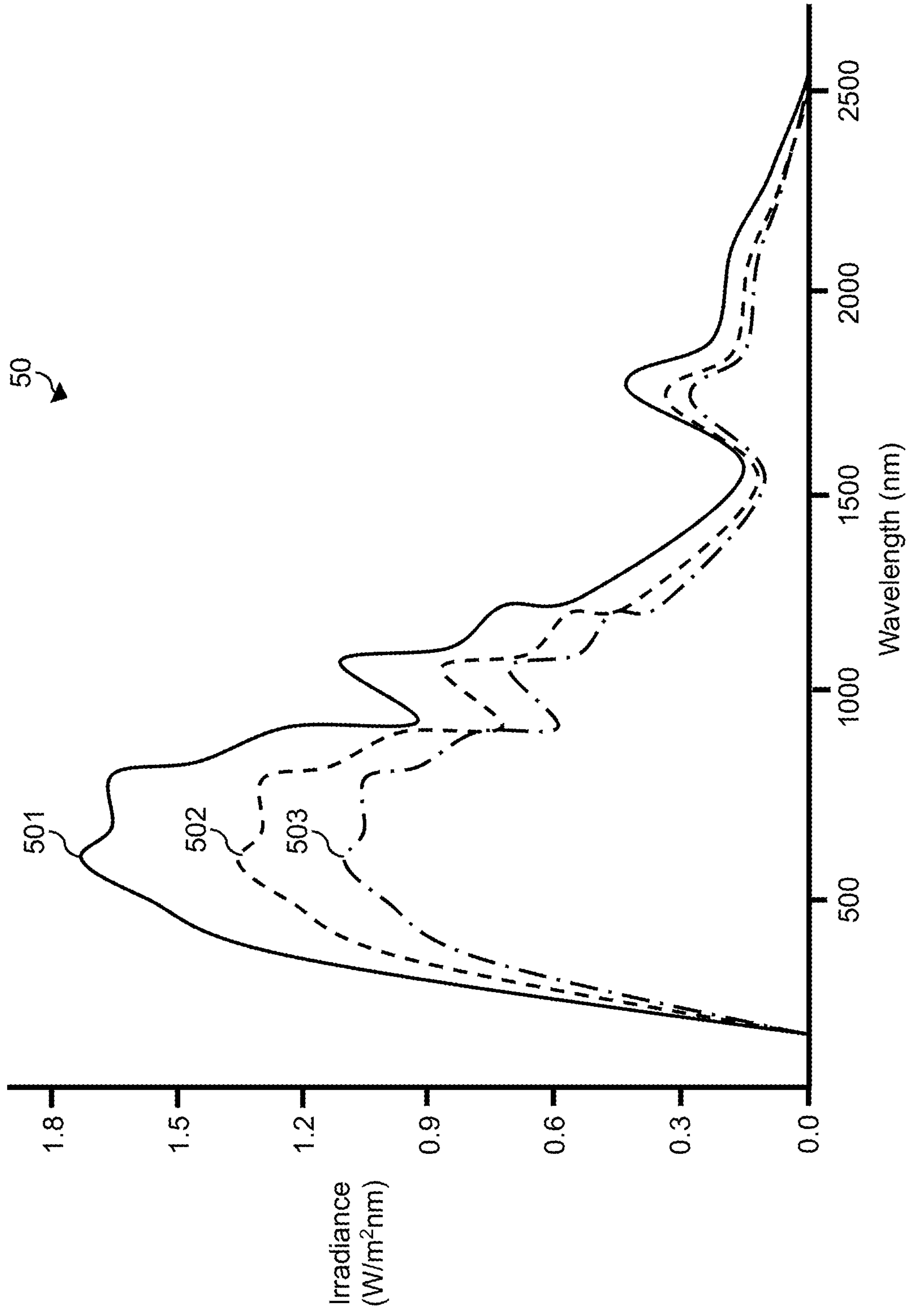
FIG. 5 is a graph of the spectral power distribution (SPD) of the sun at different times.

FIG. 5 is a graph 50 of the SPD of the sun at different times. A first sun SPD 501 is the SPD of the sun at a first time. A second sun SPD 502 is the SPD of the sun at a second time. A third sun SPD 503 is the SPD of the sun at a third time. The first, second, and third times can represent different times of the day, different days of the month, and/or different months of the year. Additional sun SPDs for each time, day (e.g., date), and/or month can be provided but are not shown in graph 50 for illustration purposes only.

Factors that affect the SPD of the sun include its declination angle, its elevation angle, and/or its azimuth angle. The sun's declination angle varies seasonally due to the tilt of the Earth on its axis of rotation and the rotation of the Earth around the sun. The sun's elevation is the angular height of the sun in the sky measured from the horizontal. The sun's elevation angle is 0° at sunrise and 90° around noon, and thus varies as a function of time. The sun's azimuth angle is the compass direction from which the sunlight is coming. The declination angle, elevation angle, and/or azimuth angle can also vary as a function of geographic location (e.g., latitude).

The SPDs of the sun for different times of the day, for different days, and/or for different months of the year can be stored in computer memory, such as random access memory (RAM) and/or one or more storage devise, such as one or more solid-state storage devices (SSDs), that is/are operably coupled to the processor(s). For example, the SPDs of the sun for different times of the day, for different days, and/or for different months can be stored in a library (e.g., a Python library) that is accessible to the processor(s).

In some embodiments, step 401 can include combining the estimated SPD of the sun with the SPD of the flash from the illumination sources 240, which can be stored in computer memory, such as RAM and/or one or more SSDs that is/are operably coupled to the processor(s). The SPD of the illumination sources 240 can be provided by the manufacturer of the illumination sources 240 or determined empirically.

The combined SPD is the sum of the SPD of the sun at the current date and time and the SPD of the flash from the illumination sources 24. At night, the SPD of the sun is zero so the combined SPD is equal to the SPD of the flash. If no flash is used during the day, the combined SPD is equal to the SPD of the sun at the current date and time. If a flash is used during the day, the combined SPD is equal to the SPD of the sun at the current date and time plus the SPD of the flash. The SPD of the sun at the current date and time can be determined using a look-up table and/or a call to a database (e.g., to a Python library for estimating spectral response of the sun at a specific date and time). The SPD of the sun can also vary with respect to weather (e.g., percent cloudiness), which can be included in the look-up table and/or database.

Figure 6:
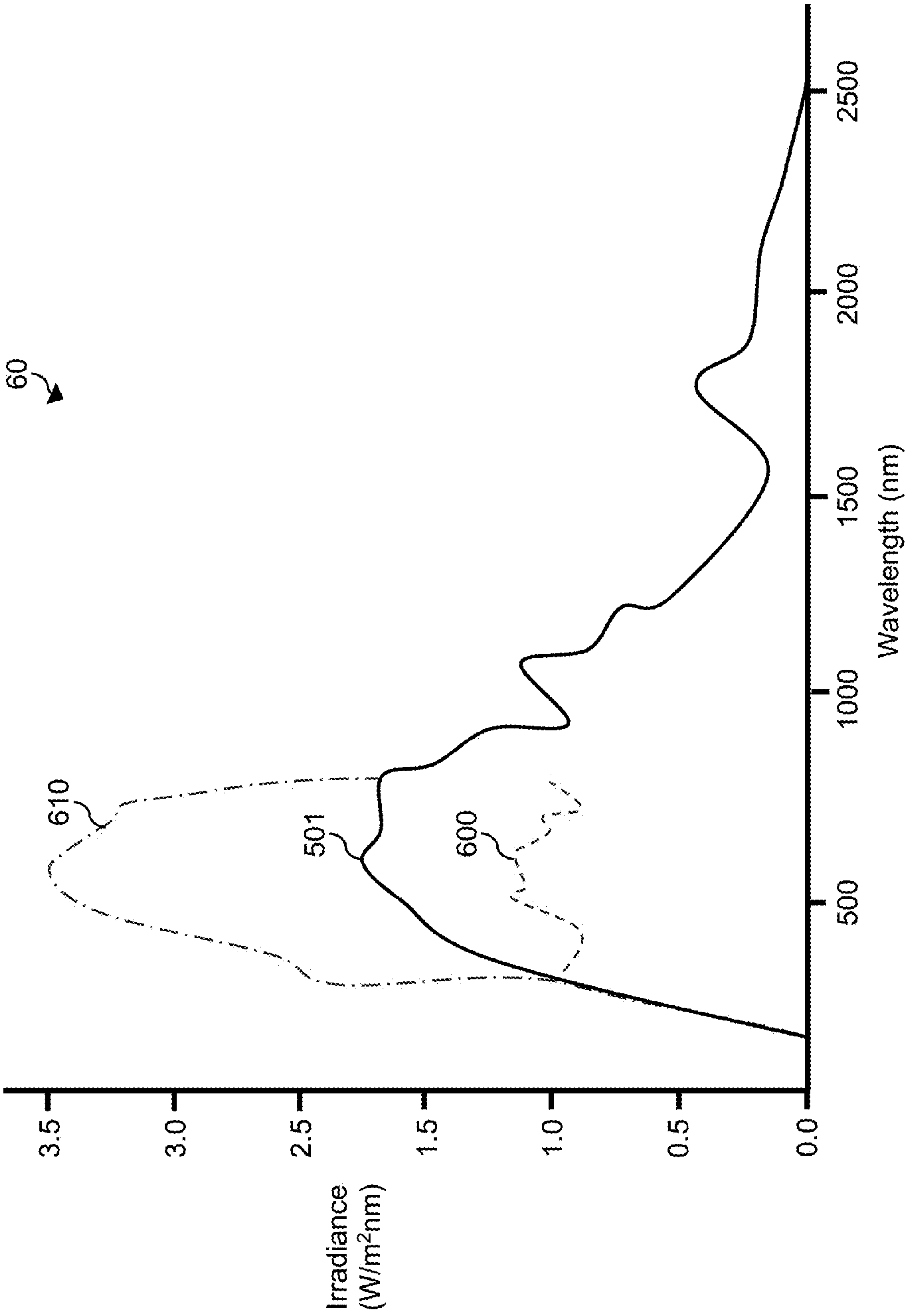
FIG. 6 is a graph of the SPD of a first sun SPD, a flash SPD, and a combined estimated SPD according to an embodiment

FIG. 6 is a graph 60 of the SPD of the first sun SPD 501, a flash SPD 600 of the illustration sources 240, and a combined estimated SPD 610 according to an embodiment. The flash SPD 600 can be relatively narrow band such as between about 400 nm and about 700 nm, but can have a different bandwidth in other embodiments. The combined estimated SPD 610 is the sum of the first sun SPD 501 (or other sun SPD) and the flash SPD 600. Since the flash SPD 600 has a narrower bandwidth than the first sun SPD 501, the combined estimated SPD 610 is the same as the first sun SPD 501 for the bandwidths that fall outside of the bandwidth of the flash SPD 600, such as greater than 700 nm and less than 400 nm.

In step 402, the white balance of the image is corrected using the estimated SPD of the sun and a camera response function of the camera 200.

The intensity $$I_c^x$$

of each pixel in an image is a function of the SPD E(λ) of light that illuminates the image (e.g., the sun and/or illumination sources 240), the reflectance function S(λ) of objects in the image, and the response function of the camera R(λ), as provided in Equation 1:

$$I_c^x = \int_{\lambda\in\omega} E_c^x(\lambda)S_c^x(\lambda)R_c^x(\lambda)d\lambda \quad (1)$$

where c is color and x is the pixel in the image.

$$c \in \omega\,[R, G, B] \quad (2)$$

$$x \in [(h, w), h \in I_H, w \in I_W] \quad (3)$$

Figure 7:
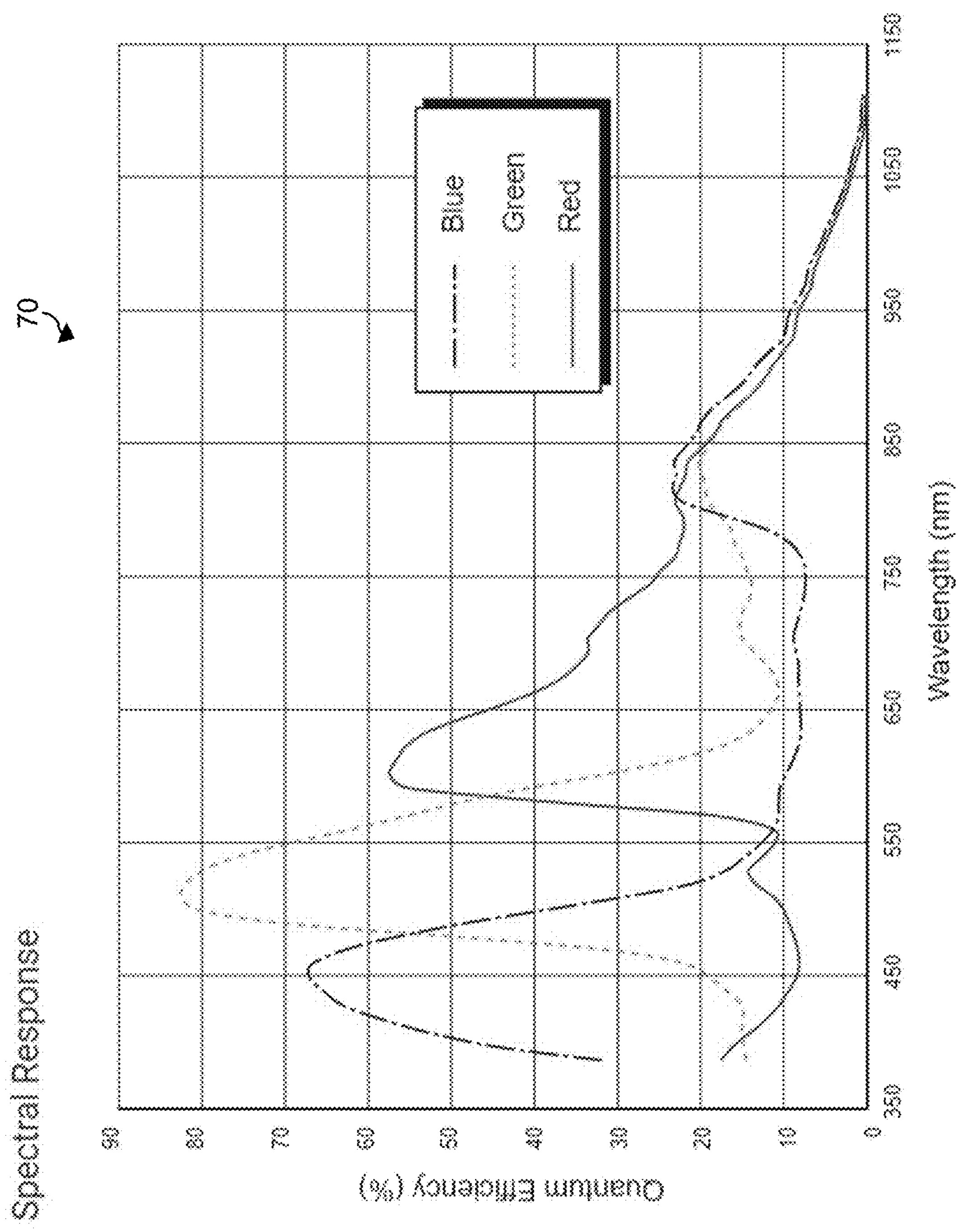
FIG. 7 is a graph of an example response function of a camera according to an embodiment.

The camera response function R(λ) can be provided by the manufacturer and/or measured in a laboratory. An example response function 70 of the camera 200 is illustrated in FIG. 7.

The reflectance function S(λ) for a white object (e.g., that reflects all illumination) is 1.

To correct for white balance, a white-balance vector can be calculated. The white-balance vector can be used to adjust the RGB intensity values of the image, according to Equation 4:

$$\begin{pmatrix} R \\ G \\ B \end{pmatrix} = WB_{Vector}\begin{pmatrix} R' \\ G' \\ B' \end{pmatrix} \quad (4)$$

where R, G, and B are the respective RGB intensity values of a white-balance corrected image and R', G', and B' are the respective RGB intensity values of the original (uncorrected) image.

The white-balance (WB) vector can be based on a color checker that includes a grid of different colors having known (e.g., published) RGB intensity values measured while the color checker is illuminated with a known SPD.

Figure 8:
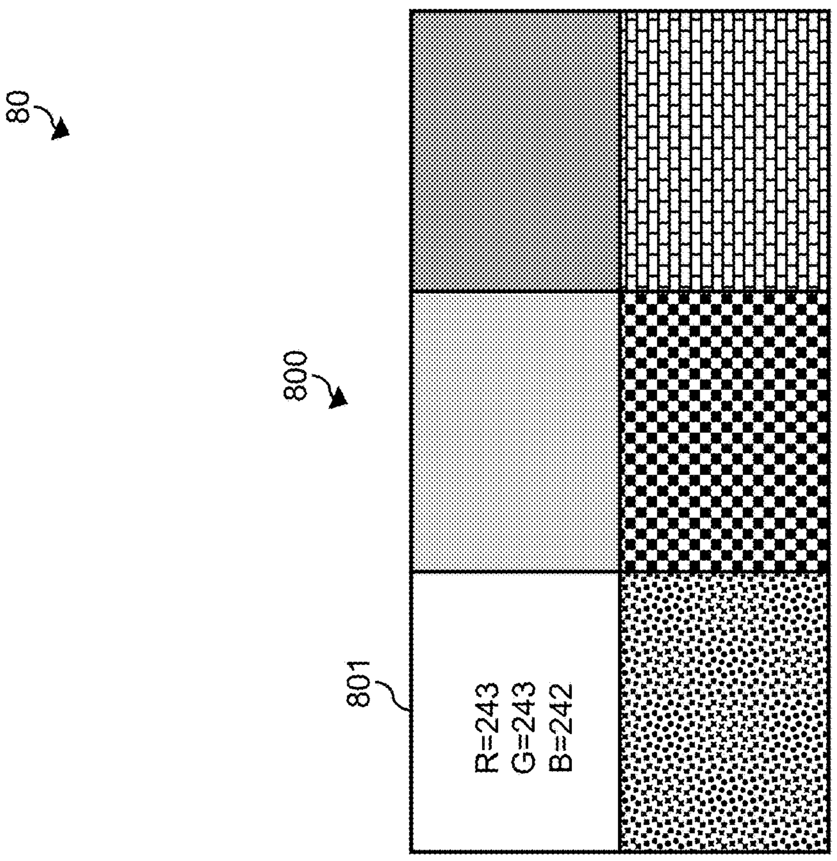
FIG. 8 illustrates a simplified example of a color-checker according to an embodiment.

A simplified example of a color-checker 80 is illustrated in FIG. 8. The color-checker 80 includes a plurality of colored squares 800 with respective published RGB intensity values. The colored squares 800 include a white color square 801 with published RGB intensity values of R=243, G=243, and B=242 when the color-checker 80 is illuminated with a published SPD.

Images of the color checker 80 can be captured with each camera 200 in different lighting conditions to compare the RGB intensity values of the white square 801 in each image with the published RGB intensity values. For example, a camera 200 can acquire an image of the color checker 80 in an unobstructed outdoor location such as a field. The measured RGB intensity values of the white color square 801 in the color checker can be 200, 155, and 194, respectively. A WB vector for the image can be defined as $$WB_{vector} = \left[\frac{243}{200}, \frac{243}{155}, \frac{242}{194}\right]$$

where $$\frac{243}{200}$$

represents a ratio of the published red RGB intensity value (243) of the white color square 801 in known lighting conditions (i.e., with a known SPD) and the red RGB intensity value (200) of the white color square 801 in the field image $$600, \frac{243}{155}$$

represents a ratio of the published green RGB intensity value (243) of the white color square 801 in known lighting conditions and the green RGB intensity value (155) of the white color square 801 in the field image, and $$\frac{242}{194}$$

represents a ratio of the published blue RGB intensity value (242) of the white color square 801 in known lighting conditions and the blue RGB intensity value (194) of the white color square 801 in the field image.

In some embodiments, the WB vector can be normalized, for example according to Equation 5:

$$WB_{vector} = \frac{\left[\frac{243}{200}, \frac{243}{155}, \frac{242}{194}\right]}{\max\left(\left[\frac{243}{200}, \frac{243}{155}, \frac{242}{194}\right]\right)} = [1, 0.76, 0.95] \quad (5)$$

Multiple WB vectors can be calculated using images acquired on different times, dates, and/or weather conditions. The multiple WB vectors can be averaged and used to adjust the white-balance correct the images (e.g., according to Equation (4)).

Alternatively, a WB vector for a current date, time, and/or weather conditions can be estimated based on a calculated WB vector (e.g., $$WB_{vector} = \left[\frac{243}{200}, \frac{243}{155}, \frac{242}{194}\right]\Big)$$

or a normalized WB vector (e.g., [1, 0.76, 0.95]). The WB vector can determined as a ratio of the known (e.g., published) SPD used for the color checker 80 and the estimated or combined SPD determined in step 401.

In some embodiments, the correcting step 302 can include applying an average color-correction matrix (CCM) to the images to improve color reproduction and consistency. In one example, improving color consistency corresponds to a minimum mean-squared color error between the RGB intensity values of color-corrected images of the colored squares 800 of the color checker 80 and the corresponding reference/published RGB intensity values for the color checker 80. The CCM can be a 3×3 matrix. The CCM can be used to color-correct images according to Equation (6):

$$\begin{pmatrix} R \\ G \\ B \end{pmatrix}_{corrected} = \left( \alpha \begin{bmatrix} a_{11} & a_{12} & a_{13} \\ a_{21} & a_{22} & a_{23} \\ a_{31} & a_{32} & a_{33} \end{bmatrix} \begin{bmatrix} r_{awb} & & \\ & g_{awb} & \\ & & b_{awb} \end{bmatrix} \begin{pmatrix} R \\ G \\ B \end{pmatrix}_{raw} \right)^{r} \quad (6)$$

where the matrix $[\alpha_{11}, \alpha_{21} \ldots \alpha_{33}]$ is the CCM, the vector $$\begin{pmatrix} R \\ G \\ B \end{pmatrix}_{raw}$$

represents the uncorrected RGB intensity values for the colored square 800 in the image, the vector $$\begin{pmatrix} R \\ G \\ B \end{pmatrix}_{corrected}$$

represents the corrected RGB intensity values for the colored square 800 in the image.

Figure 9:
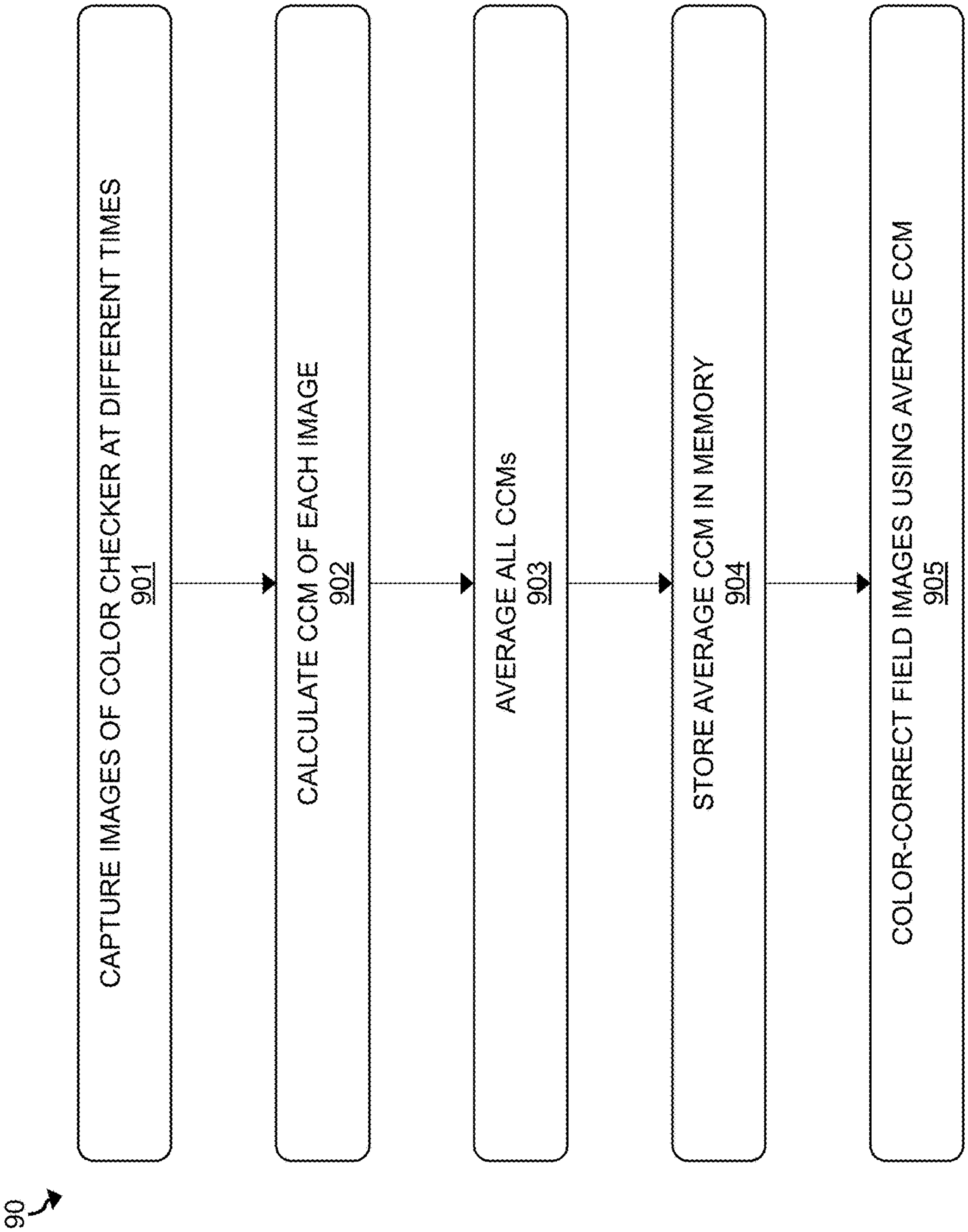
FIG. 9 is a flow chart of a method for color-correcting an image according to an embodiment.

In an embodiment, the CCM can be determined according to method 90 in the flow chart illustrated in FIG. 9. In step 901, images of the color checker 80 are captured with a camera 200 at multiple times and/or throughout the day (e.g., including daytime and nighttime) at an unobstructed outdoor location such as a field. The light/illumination source(s) 240 for the camera 200 can be used when taking the images of the color checker 80 to represent the total light (solar and light/illumination source) or SPD used to take field images with the selective sprayer system 10.

In step 902, a CCM of each image is calculated. In general, the measured RGB intensity value of each colored square 800 in each image of the color checker 80 is compared with its respective published value to determine a correction ratio for the respective RGB intensity values for each colored square 800. The CCM can be calculated using the Finlayson algorithm "Color Correction Using Root-Polynomial Regression" or convolutional neural networks (CNNs) with Barron's Convolutional Color Constancy model. Other algorithms or models can be used in other embodiments.

In step 903, the CCMs of all images are averaged to form an average CCM. Additional images of the color checker 500 in different lighting conditions can be captured and color-corrected using the average CCM to confirm accurate results. In step 904, the average CCM is stored in memory operably coupled to the processor(s), such as RAM and/or one or more SSDs as storage device 106.

In step 905, images of field areas that may include target growth (e.g., one or more weeds) are color-corrected in real time using the average CCM stored in memory. The color-corrected images can be provided to a trained machine-learning (ML) model to detect whether one or more weeds is/are present in the color-corrected images. Alternatively, the color-corrected images can be used as training images to train or further train an ML. Step 905 can be performed during and/or as part of the correcting step 302 (FIG. 3) to color-correct the images of the agricultural field.

Using an average CCM can reduce processing time to increase throughput during real-time color correction of the images.

A dynamic correction table can be used to color correct the images. The dynamic correction table can be based on the SPD of the sun at the specific date and time of day that the image is captured (and optionally including the weather) the SPD of any supplemental lighting/flash used to capture the image.

An aspect of the technology is directed to a method for calibrating the color of a captured image in all lighting conditions. The method uses the camera detector spectral response, SPD of the camera's flash, the SPD of the sunlight, and/or the time of day for calculating the sun position in relation to the system/camera position. This method enables white balance and normalized color of the captured image in various light conditions to optimize results of machine-learning detectors.

Another aspect of the technology is directed to a system configured to calibrate color of an image in conjunction with an already trained machine learning (ML) model. The system includes an agricultural vehicle 100 comprising a spray boom 130. One or more cameras (e.g., cameras 200) is/are mounted on the spray boom each camera configured capture images of a field in the direction of movement of said agricultural vehicle. One or more lighting units (e.g., illumination sources 240) is/are configured to illuminate the agricultural field when the camera captures the images. The system further includes a processing unit operatively coupled to storage space (e.g., memory) operative to store at least one of the images and an already trained ML model configured to detect one or more weeds in each of the images. A geolocation sensor can be configured to send a location of the system to the processing unit. A time and date module and/or a real-time clock device can be configured to send real-time time and/or date data to the processing unit. The processing unit is configured to calculate a color and/or contrast and/or intensity correction to each image based on: (a) a sun spectral power distribution at the geoposition of the system/camera and time and date when the image is captured; and combined with the camera spectral response function and the SPD of the lighting unit, produce a corrected image that is provided to the trained ML model, thereby enabling usage of the trained ML model in various outdoor light conditions that vary from the conditions under which the ML model was trained.

In some embodiments, the correcting step 302 can include applying distortion-correction parameters to the images to correct for geometric distortion and/or for radial distortion of the images. The distortion-correction parameters can translate and/or stretch the images to reduce geometric distortion and/or for radial distortion.

Figure 10A:
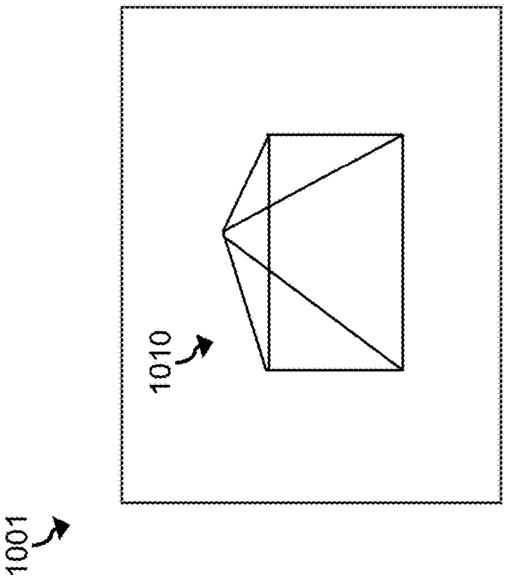
FIG. 10A illustrates a first image of an object that is not geometrically distorted
Figure 10B:
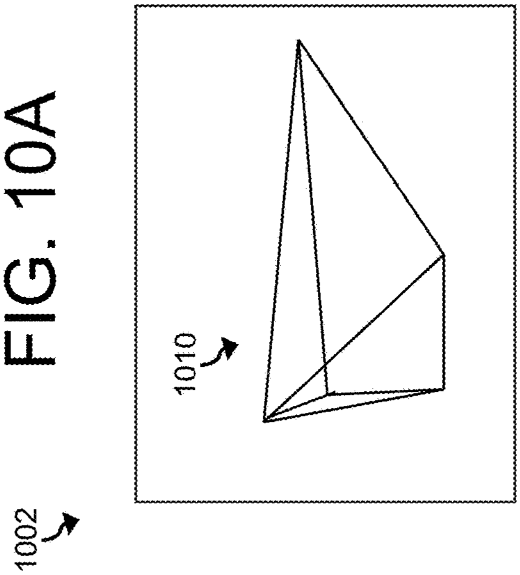
FIG. 10B illustrates a second image of an object that is geometrically distorted.

An example of geometric distortion of an object in an image is illustrated in FIGS. 10A and 10B. FIG. 10A illustrates a first image 1001 of an object 1010 that is not geometrically distorted. The camera may be directly in front (e.g., head on) of the object 1010 to acquire the first image 1001 or the first image 1001 may be image-corrected. FIG. 10B illustrates a second image 1002 of the object 1010 that is geometrically distorted. The camera may be laterally and/or vertically offset from the object 1010 to acquire the second image 1002. This tilt of the camera causes geometric distortion compared to an overhead view.

Figure 11A:
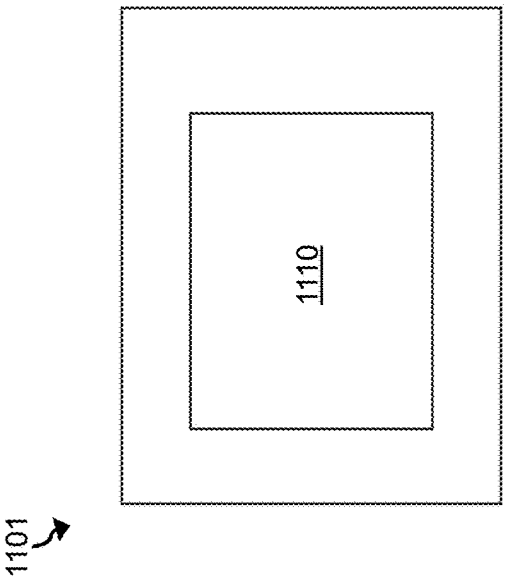
FIG. 11A illustrates a first image of an object that is not radially distorted.
Figure 11B:
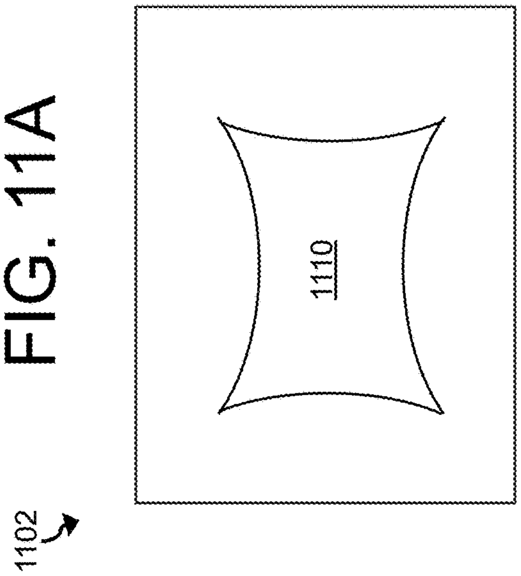
FIG. 11B illustrates a second image of an object that is radially distorted.

An example of radial distortion of an object in an image is illustrated in FIGS. 11A and 11B. FIG. 11A illustrates a first image 1101 of an object 1110 that is not radially distorted. The first image 1101 may be image-corrected to correct for radial distortion. FIG. 11B illustrates a second image 1112 of the object 1110 that is radially distorted. Radial distortion can also be referred to as pin-cushion distortion. Radial distortion can occur due to the unequal bending of light in the camera lens (e.g., in a fisheye lens). The light rays bend more near the edge of the lens than the light rays near the center of the lens. Radial distortion causes straight lines in the real work to appear curved in the image.

The distorted images can be processed to normalize and/or correct for any distortions, such as geometric and/or radial distortions. Normalizing and/or correcting for distortions can include performing camera calibrations to estimate the camera's parameters. The camera's parameters can include internal parameters and external parameters of the camera and/or lens. The internal parameters can include the focal length, radial distortion coefficient(s) of the lens, and/or other internal parameters. The external parameters can include the orientation (e.g., rotation, tilt angle, and/or translation) of the camera. The internal parameters and external parameters can be used to determine an accurate relationship between a 3D point in the real-world (e.g., in real space) and its corresponding 2D projection (e.g., pixel) in the image (e.g., in image space). This relationship can be described as a projection matrix that can be applied to the acquired image such that it is stretched and/or transposed from a distorted image to a corrected image that simulates a vertical overhead view of the real space.

Figure 12:
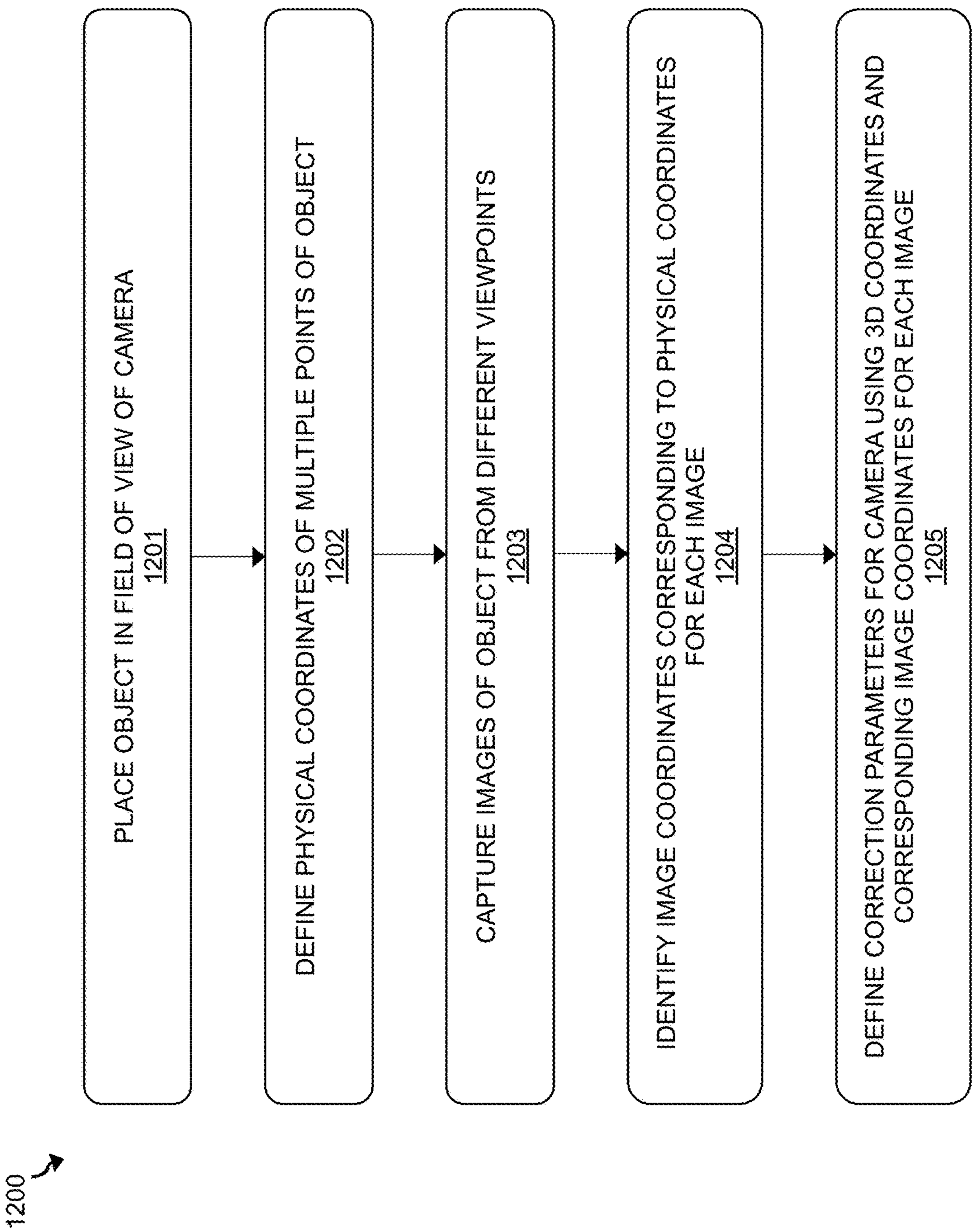
FIG. 12 is a flow chart of a method for calibrating a camera to define distortion-correction parameters according to an embodiment.

FIG. 12 is a flow chart of a method 1200 for calibrating a camera to define distortion-correction parameters according to an embodiment. The distortion-correction can be used to stretch and/or transpose a distorted two-dimensional image acquired with a camera that is oriented at an angle with respect to a target field area to a corrected image that simulates a vertical overhead view of the real three-dimensional space.

In step 1201, an object is placed in the FOV of a camera 200. The object can have a known size and geometry.

In step 1202, the physical (3D) coordinates of multiple points on the object are defined. The physical coordinates can be defined on the edge or perimeter of the object. For example, when the object is rectangular, the physical coordinates can include the four corners of the rectangular object. In some embodiments, the object can include a regular/repeating pattern. An example of a rectangular object that includes a regular/repeating pattern is a checkerboard or a chessboard (in general, checkerboard). The rectangular object can have another pattern or can be unpatterned in other embodiments. The size of the predetermined object is known or measured. For example, the width, height, diameter, and/or other dimension(s) of the object as applicable is/are measured and/or determined.

When the rectangular object has a checkerboard pattern, the real-world coordinates of each rectangle in the checkerboard pattern, the vertices (e.g., corners) of the rectangles in the checkerboard pattern, and/or the four corners of the rectangular object can be defined.

In other embodiments, the pattern can include a circle pattern such as a symmetrical circle pattern or an asymmetrical circle pattern.

In step 1203, images of the object are taken from multiple viewpoints with the camera. For example, the angle of the camera with respect to the object can be varied over an angle range. The angle of the camera can be defined between a first axis that is orthogonal to the external surface of the object (e.g., when the object has a planar external surface) and that passes through the center of the object and a second axis that passes through the aperture of the camera. The angle range can be from 0 degrees to about 45 degrees or another angle range. An angle of 0 degrees can correspond to when the first and second axes are parallel (i.e., when the camera is directly over and/or aligned with the center of the object). In some embodiments, the camera can be offset with respect to the center of the object, in which case the first axis can be offset from the center of the object.

In some embodiments, the camera can be mechanically coupled to an actuator or other device that can automatically tilt the camera at different angles over the angle range to automatically capture images at various angles. Additionally or alternatively, the camera can be mounted on a positioning apparatus that can vary the distance between the camera and the object (e.g., in a direction orthogonal to the plane of the object's surface) and/or can translate the camera laterally (e.g., in a direction parallel to the plane of the object's surface) to automatically capture images at different distances and/or offsets.

All of the points defined in step 1202 can be viewable in each image taken in step 1203. In other embodiments, only some of the points defined in step 1202 are viewable in one or more images taken in step 1203.

Figure 13:
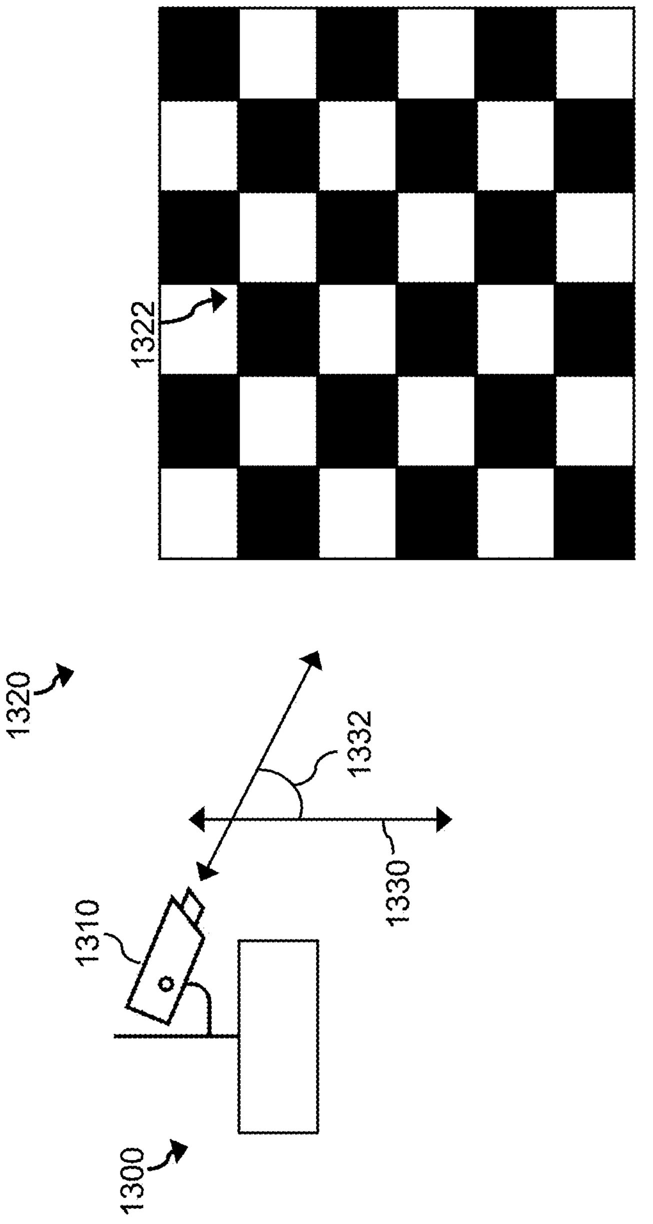
FIG. 13 illustrates an example of a positioning apparatus for a camera to capture images of an object from different orientations.

FIG. 13 illustrates an example of a positioning apparatus 1300 for a camera 1310 to capture images of an object 1320 from different orientations. The positioning apparatus 1300 can tilt the camera at various angles 1332 with respect to a vertical axis 1330 that is orthogonal to the surface of the object 1320. Additionally or alternatively, the positioning apparatus 1300 can move laterally with respect to the object 1320 and/or adjust the height of the camera 1310 with respect to the object 1320. The object 1320 is rectangular and includes a checkerboard pattern. In other embodiments, the object 1302 can include a different shape and/or a different pattern (or no pattern). The camera 1310 can be the same as camera 200.

Figure 14:
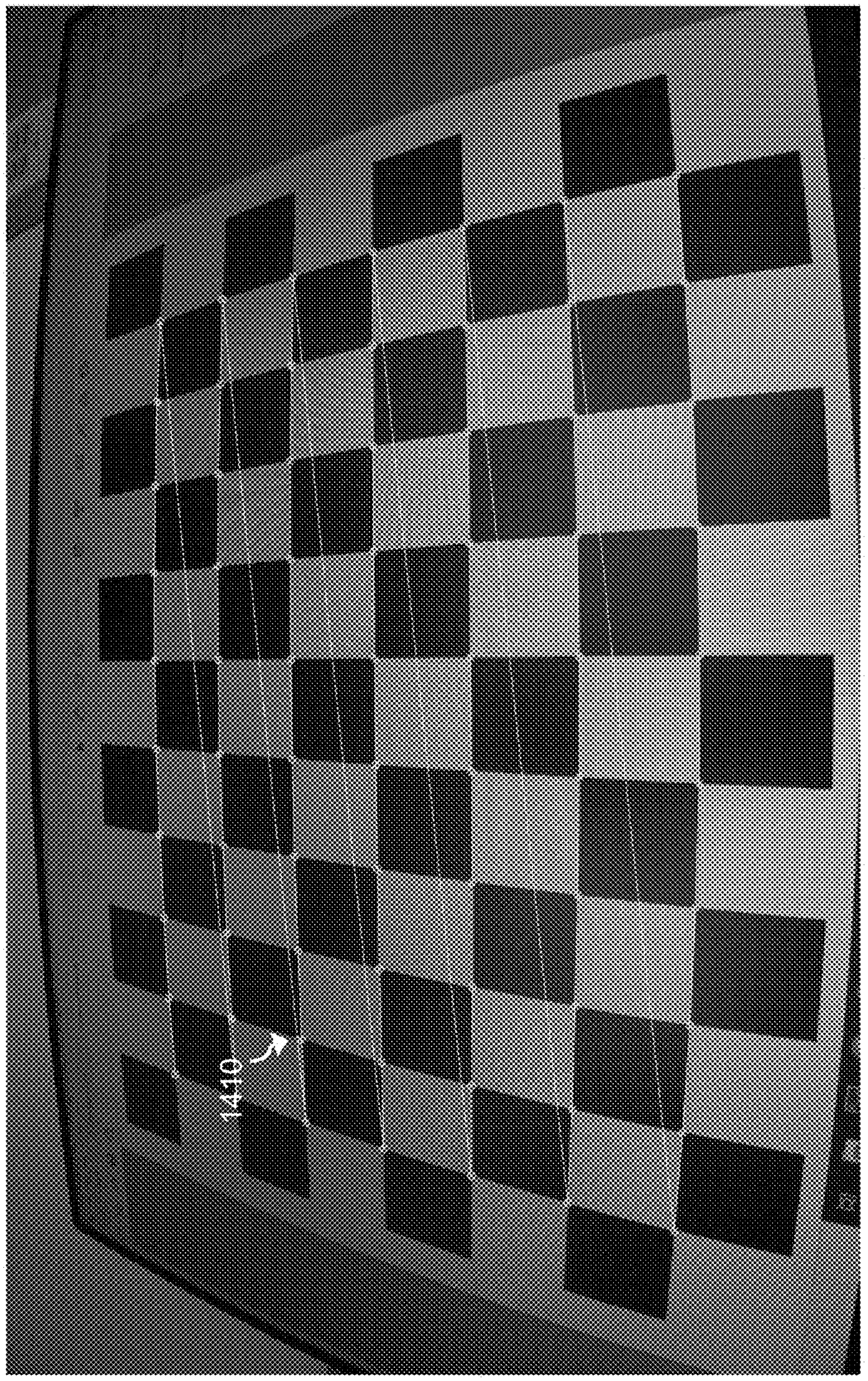
FIG. 14 illustrates an example of a distorted image of an object used for distortion calibration.

The images captured in step 1203 can include geometric and/or radial distortion. An example of a distorted image 1400 of the object 1320 is illustrated in FIG. 14. The distortion in the image 1400 is highlighted by the horizontal lines 1410, which are not part of the image 1400 but included for illustration purposes only. Image 1400 includes geometric and radial distortion.

In step 1204, image coordinates corresponding to the physical coordinated (e.g., 3D points) defined in step 1202 are identified and/or determined. The image coordinates are 2D coordinates within the image space of the image. In an embodiment, the image coordinates can be identified using the findChessboardCorners( ) function call in OpenCV (Open Source Computer Vision Library), available at http://opencv.org. For example, the findChessboardCorners( ) function can be used to locate the internal chessboard corners where the black squares touch each other. An example of the corners 1322 where the black (and white) squares touch each other is illustrated in FIG. 13.

In step 1205, the correction parameters for the camera are determined. The correction parameters for a given image are determined using the image coordinates (2D coordinates) identified in step 1204 and the corresponding physical (3D) points defined in step 1202. Each image can correspond to a different camera angle or viewpoint. The correction parameters can include a correction matrix. In some embodiments, the correction parameters and/or correction matrix can be determined using the calibrateCamera( ) function in OpenCV. Separate correction parameters and/or correction matrices can be provided to correct for geometric distortion and for radial distortion, respectively. Alternatively, the correction parameters and/or correction matrices can correct for both geometric and radial distortion.

Figure 15:
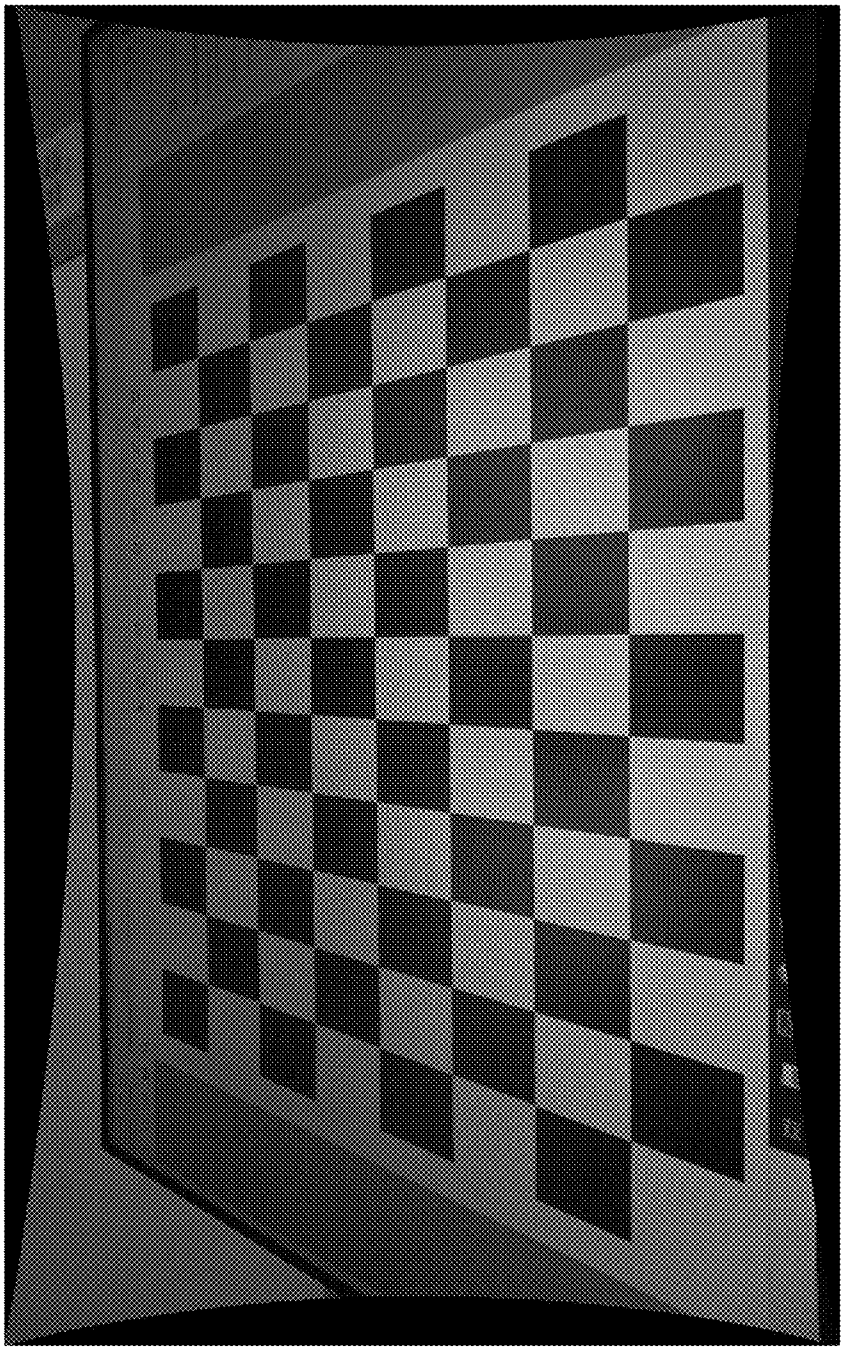
FIG. 15 illustrates a corrected image that has been stretched and/or transposed to correct for radial distortion.
Figure 16:
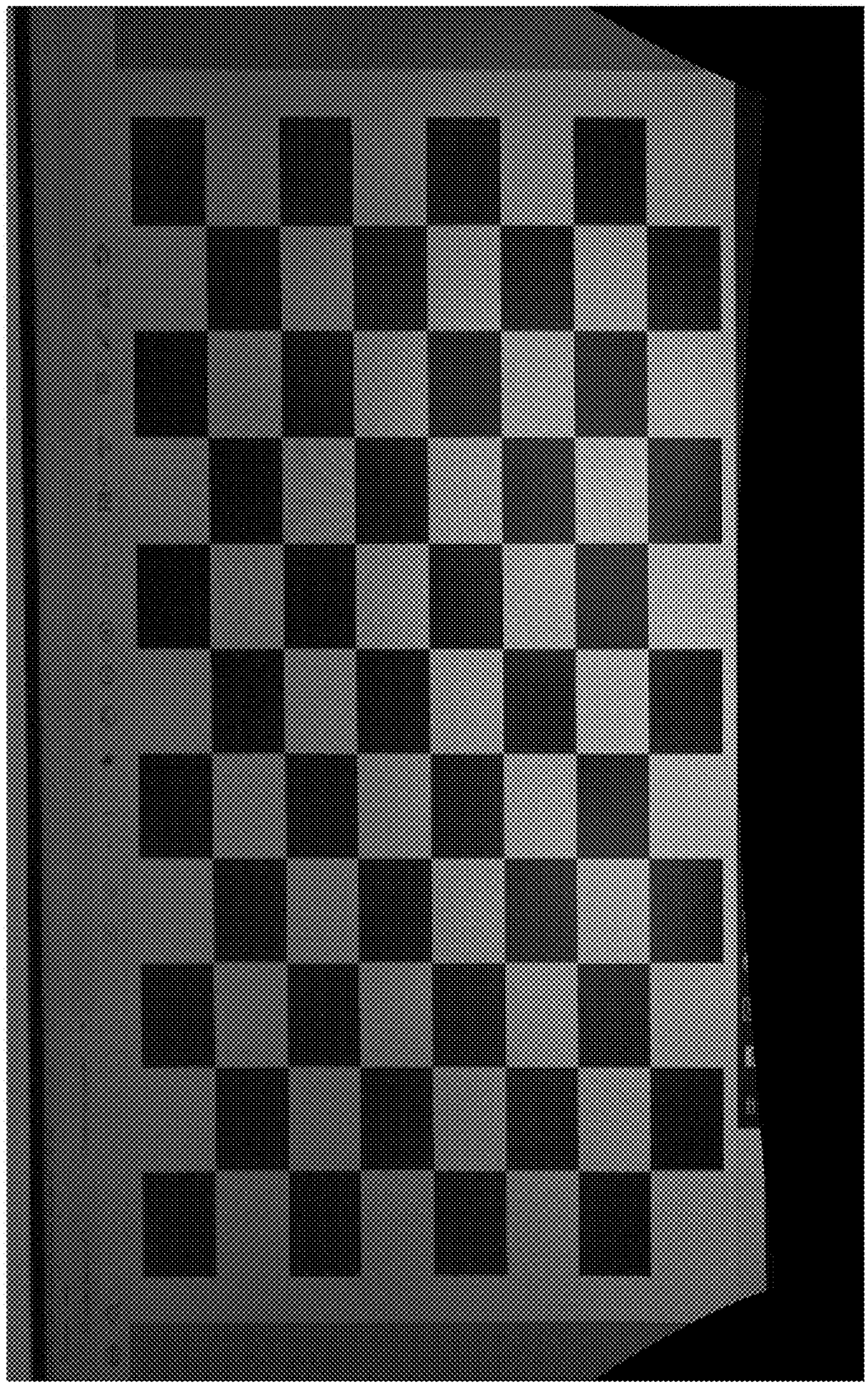
FIG. 16 illustrates a corrected image has been stretched and/or transposed to correct for geometric distortion.

Example corrected images 1500, 1600 of the distorted image 1400 of the chessboard/checkerboard pattern are provided in FIGS. 15 and 16, respectively. Corrected image 1500 has been stretched and/or transposed to correct for radial distortion. Corrected image 1600 has been stretched and/or transposed to correct for geometric distortion caused by the tilt angle of the camera with respect to the plane of the chessboard/checkerboard pattern. Corrected image 1600 includes the radial-distortion corrections of corrected image 1500 in addition to geometric-distortion corrections. Corrected image 1600 simulates a head-on image of the chessboard/checkerboard pattern taken with a camera angle of 0 degrees.

In some embodiments, the correction parameters can be optimized. For example, the correction parameters for geometric distortion and the correction parameters for radial distortion can be combined (e.g., multiplied) and stored in memory in a combined (e.g., previously-multiplied) form, which can reduce processing time during real-time correction of field images.

As can be seen, the correction parameters can be applied to translate and/or stretch images that include geometric and/or radial distortion to cause the distorted images to appear as non-distorted and taken head on at a camera angle of 0 degrees. The correction parameters can be applied in the post-processing step 302 (FIG. 3) to distortion-correct the images of the agricultural field in real time.

Figure 17:
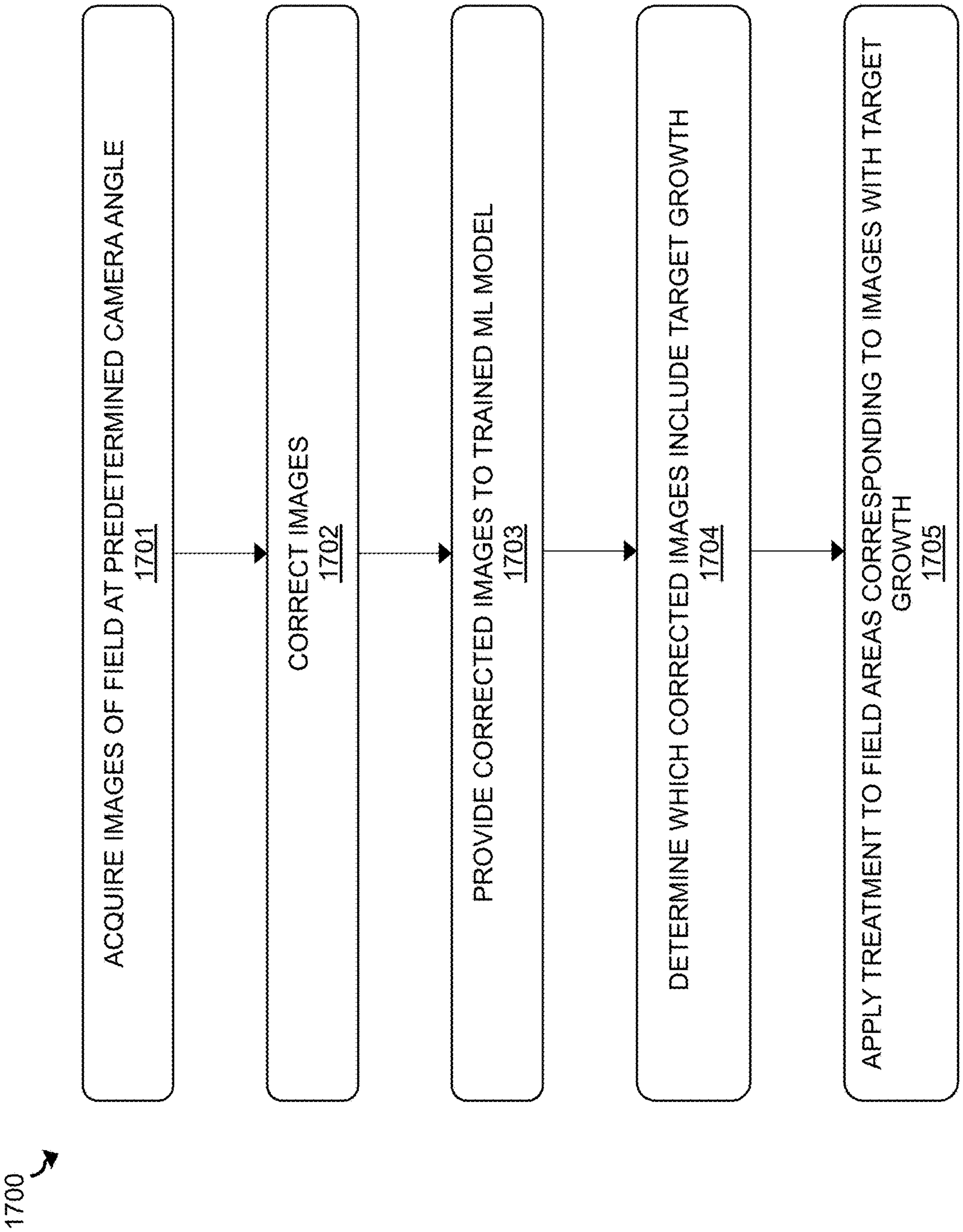
FIG. 17 is a flow chart of a method for selectively applying a treatment to a target region using corrected images according to an embodiment.

FIG. 17 is a flow chart of a method 1700 for selectively applying a treatment to a target region using corrected images according to an embodiment. In step 1701, images of an agricultural field are acquired at a predetermined camera angle. The images are acquired with one or more (e.g., multiple (e.g., an array of)) cameras (e.g., cameras 200) and/or image sensors that can be located along the length of a spray boom (e.g., spray boom 130). When there are multiple cameras and/or image sensors, the camera(s) and/or image sensor(s) can be evenly spaced along the length of the spray boom.

In step 1702, the acquired images are corrected in real time. The acquired images may be white-balance corrected, color corrected, and/or distortion corrected, as described herein.

In step 1703, the corrected images are provided to a trained ML model that has been trained to identify target growth (e.g., weeds and/or optionally crops).

In step 1704, the trained machine ML determines whether there is target growth (e.g., weeds) (or sufficient target growth) in the field areas corresponding to the corrected images. The training images (e.g., image data) used to train the trained ML model (e.g., training dataset(s)) include or consist of non-distorted head-on images of field areas. Thus, the corrected images allow the trained machine learning model to more accurately predict whether there is target growth (e.g., weeds) (or sufficient target growth) in the respective field areas compared to when distorted images are provided to the trained ML model. In addition, the training images are white-balanced and/or color corrected. Using corrected images that are white-balanced and/or color corrected allows the trained ML model to more accurately predict whether there is target growth (e.g., weeds) (or sufficient target growth) in the respective field areas compared to when uncorrected images are provided to the trained ML model.

In step 1705, a treatment is selectively applied to the field areas corresponding to the corrected images that are predicted by the trained machine learning model to include target growth (e.g., weeds) (or sufficient target growth). The treatment can include a chemical treatment such as an herbicide that can be selectively applied by a respective spot-spray nozzle on the spray boom that is aligned with the FOV of the camera or image sensor that captured the image of the field areas that are predicted to include the target growth.

Figure 18:
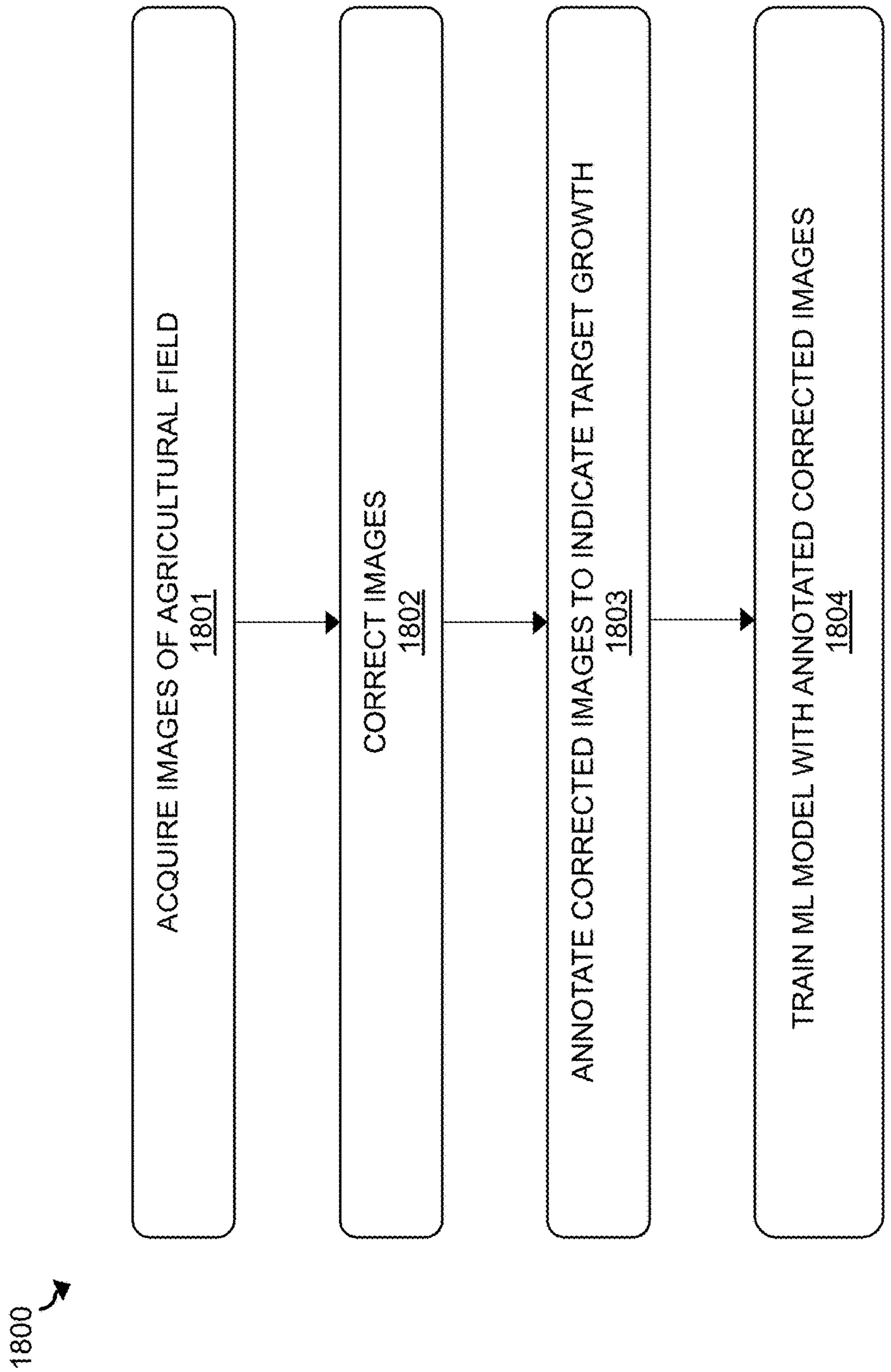
FIG. 18 is a flow chart of a method for training an ML model using corrected images according to an embodiment.

FIG. 18 is a flow chart of a method 1800 for training an ML model using corrected images according to an embodiment. In step 1801, images of an agricultural field are acquired. The images can be acquired by cameras 200 on a spray boom 130 or by other cameras.

In step 1802, the acquired images are corrected in real time. The acquired images may be white-balance corrected, color corrected, and/or distortion corrected, as described herein.

In step 1803, the corrected images are annotated to indicate whether they include or do not include a target growth (e.g., weeds and/or optionally crops). The corrected images can be annotated automatically and/or manually.

In step 1804, the annotated corrected images are fed to an ML model to train the ML model to detect the target growth. Using corrected images to train an ML model improves the training (e.g., prediction accuracy) of the trained ML model, for example by improving the consistency of the images.

Figure 19:
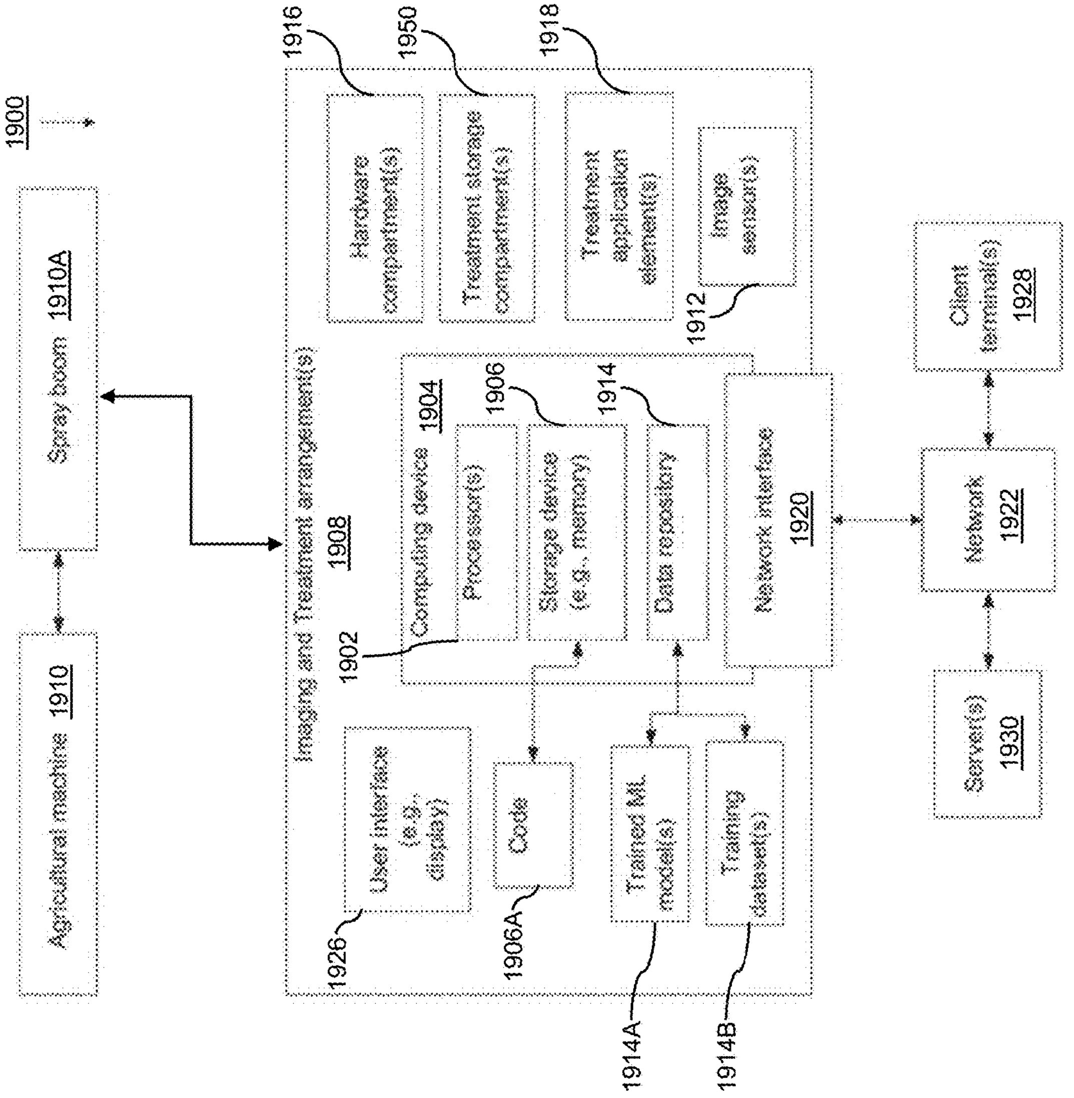
FIG. 19 is a block diagram of a system for selectively applying a treatment to a target region according to an embodiment.

FIG. 19 is a block diagram of a system 1900 for selectively applying a treatment to a target region according to an embodiment. System 1900 can be the same or as different than system 10. System 1900 includes one or more imaging and treatment arrangements 1908 connected to an agricultural machine 1910, for example, a tractor, an airplane, an off-road vehicle, or a drone. Agricultural machine 1910 may include and/or be connected to a spray boom 1910A and/or another boom. Imaging and treatment arrangements 1908 may be arranged along a length of agricultural machine 1910 and/or spray boom 1910A. For example, the imaging and treatment arrangements 1908 can be evenly spaced every 1-3 meters along the length of spray boom 1910A. Spray boom 1910A may be long, for example, 10-50 meters, or other lengths. Spray boom 1910A may be pushed or pulled by the agricultural machine 1910. In another embodiment, the system 1900 only includes one imaging and treatment arrangement 1908.

An example imaging and treatment arrangement 1908 is depicted for clarity, but it is to be understood that system 1900 may include multiple imaging and treatment arrangements 1908 as described herein. It is noted that each imaging and treatment arrangement 1908 may include all components described herein. Alternatively, one or more imaging and treatment arrangements 1908 share one or more components, for example, multiple imaging and treatment arrangements 1908 share a common computing device 1904, common memory 1906, and/or common processor(s) 1902.

Each imaging and treatment arrangement 1908 includes one or more image sensors 1912, for example, a color sensor, optionally a visible light-based sensor, for example, a red-green-blue (RGB) sensor such as CCD and/or CMOS sensors, and/or other cameras and/or other sensors such as an infra-red (IR) sensor, near infrared sensor, ultraviolet sensor, fluorescent sensor, LIDAR sensor, NDVI sensor, a three-dimensional sensor, and/or multispectral sensor. Image sensor(s) 1912 are arranged and/or positioned to capture images of a portion of the agricultural field (e.g., located in front of image sensor(s) 1912 and along a direction of motion of agricultural machine 1910).

A computing device 1904 receives the image(s) from image sensor(s) 1912, for example, via a direct connection (e.g., local bus and/or cable connection and/or short-range wireless connection), a wireless connection and/or via a network. The image(s) are corrected (e.g., as described herein) by processor(s) 1902, which feeds the corrected image(s) into a trained ML model 1914A (e.g., trained on one or more training dataset(s) 1914B which are optionally included in the imaging and treatment arrangement(s) 1908). The trained ML model 1914A can be configured to detect a target growth, such as a specific type of weed, within the FOV of the cameras (e.g., image sensors 1912), that is separate from a desired growth (e.g., a crop). One treatment storage compartment 1950 may be selected from multiple treatment storage compartments according to the outcome of trained ML model 1914A, for administration of a treatment by one or more treatment application element(s) 1918, as described herein.

Hardware processor(s) 1902 of computing device 1904 may be implemented, for example, as one or more CPUs, one or more GPUs, field programmable gate array(s) (FPGA), digital signal processor(s) (DSP), and/or application specific integrated circuit(s) (ASIC). Processor(s) 1902 may include a single processor, or multiple processors (homogenous or heterogeneous) arranged for parallel processing, as clusters and/or as one or more multi core processing devices.

Storage device (e.g., memory) 1906 stores code instructions executable by hardware processor(s) 1902, for example, a RAM, a read-only memory (ROM), and/or a storage device, for example, non-volatile memory, magnetic media, semiconductor memory devices, hard drive, removable storage, and optical media (e.g., DVD, CD-ROM). Memory 1906 stores code 1906A that implements one or more features and/or instructions to be executed by hardware processor(s) 1902. Memory 1906 can comprise or consist of solid-state memory and/or a solid-state device.

Computing device 1904 may include a data repository (e.g., storage device(s)) 1914 for storing data, for example, trained ML model(s) 1914A which may include a detector component and/or a classifier component. The data storage device(s) 1914 also store the captured real-time images taken with the respective image sensor 1912. Data storage device(s) 1914 may be implemented as, for example, a memory, a local hard-drive, virtual storage, a removable storage unit, an optical disk, a storage device, and/or as a remote server and/or computing cloud (e.g., accessed using a network connection). Additional details regarding the trained ML model(s) 1914A and the training dataset(s) 1914B are described in U.S. Pat. No. 11,393,049, titled "Machine Learning Models For Selecting Treatments For Treating an Agricultural Field," which is hereby incorporated by reference.

Computing device 1904 is in communication with one or more treatment storage compartment(s) (e.g., tanks) 1950 and/or treatment application elements 1918 that apply treatment for treating the field and/or plants growing on the field. There may be two or more treatment storage compartment(s) 1950, for example, one compartment storing chemical(s) specific to a target growth such as a specific type of weed, and another compartment storing broad chemical(s) that are non-specific to target growths such as designed for different types of weeds. There may be one or multiple treatment application elements 1918 connected to the treatment storage compartment(s) 1950, for example, a spot sprayer connected to a first compartment storing specific chemicals for specific types of weeds, and a broad sprayer connected to a second compartment storing non-specific chemicals for different types of weeds. Other examples of treatments and/or treatment application elements 1918 include: gas application elements that apply a gas, electrical treatment application elements that apply an electrical pattern (e.g., electrodes to apply an electrical current), mechanical treatment application elements that apply a mechanical treatment (e.g., sheers and/or cutting tools and/or high pressure-water jets for pruning crops and/or removing weeds), thermal treatment application elements that apply a thermal treatment, steam treatment application elements that apply a steam treatment, and laser treatment application elements that apply a laser treatment.

Computing device 1904 and/or imaging and/or treatment arrangement 1908 may include a network interface 1920 for connecting to a network 1922, for example, one or more of, a network interface card, an antenna, a wireless interface to connect to a wireless network, a physical interface for connecting to a cable for network connectivity, a virtual interface implemented in software, network communication software providing higher layers of network connectivity, and/or other implementations.

Computing device 1904 and/or imaging and/or treatment arrangement 108 may communicate with one or more client terminals (e.g., smartphones, mobile devices, laptops, smart watches, tablets, desktop computer) 1928 and/or with a server(s) 1930 (e.g., web server, network node, cloud server, virtual server, virtual machine) over network 1922. Client terminals 1928 may be used, for example, to remotely monitor imaging and treatment arrangement(s) 1908 and/or to remotely change parameters thereof. Server(s) 1930 may be used, for example, to remotely collected data from multiple imaging and treatment arrangement(s) 1908 optionally of different agricultural machines, for example, to create new training datasets and/or update exiting training dataset for updating the ML models with new images.

Network 1922 may be implemented as, for example, the internet, a local area network, a wire-area network, a virtual network, a wireless network, a cellular network, a local bus, a point-to-point link (e.g., wired or wireless), and/or combinations of the aforementioned.

Computing device 1904 and/or imaging and/or treatment arrangement 1908 includes and/or is in communication with one or more physical user interfaces 1926 that include a mechanism for user interaction, for example, to enter data (e.g., define threshold and/or set of rules) and/or to view data (e.g., results of which treatment was applied to which portion of the field).

Example physical user interfaces 1926 include, for example, one or more of, a touchscreen, a display, gesture activation devices, a keyboard, a mouse, and/or voice activated software using speakers and microphone. Alternatively, client terminal 1928 serves as the user interface, by communicating with computing device 1904 and/or server 1930 over network 1922.

Treatment application elements 1918 may be adapted for spot spraying and/or broad (e.g., band) spraying, for example as described in U.S. Provisional Patent Application No. 63/149,378, filed on Feb. 15, 2021, which is hereby incorporated by reference.

System 1900 may include a hardware component 1916 associated with the agricultural machine 1910 for dynamic adaption of the herbicide applied by the treatment application element(s) 1918 according to dynamic orientation parameter(s) computed by analyzing an overlap region of images captured by image sensors 1912, for example as described in U.S. Provisional Patent Application No. 63/082,500, filed on Sep. 24, 2020, which is hereby incorporated by reference.

The invention should not be considered limited to the particular embodiments described above. Various modifications, equivalent processes, as well as numerous structures to which the invention may be applicable, will be readily apparent to those skilled in the art to which the invention is directed upon review of this disclosure. The above-described embodiments may be implemented in numerous ways. One or more aspects and embodiments involving the performance of processes or methods may utilize program instructions executable by a device (e.g., a computer, a processor, or other device) to perform, or control performance of, the processes or methods.

In this respect, various inventive concepts may be embodied as a non-transitory computer readable storage medium (or multiple non-transitory computer readable storage media) (e.g., a computer memory of any suitable type including transitory or non-transitory digital storage units, circuit configurations in Field Programmable Gate Arrays or other semiconductor devices, or other tangible computer storage medium) encoded with one or more programs that, when executed on one or more computers or other processors, perform methods that implement one or more of the various embodiments described above. When implemented in software (e.g., as an app), the software code may be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer, as non-limiting examples. Additionally, a computer may be embedded in a device not generally regarded as a computer but with suitable processing capabilities, including a Personal Digital Assistant (PDA), a smartphone or any other suitable portable or fixed electronic device.

Also, a computer may have one or more communication devices, which may be used to interconnect the computer to one or more other devices and/or systems, such as, for example, one or more networks in any suitable form, including a local area network or a wide area network, such as an enterprise network, and intelligent network (IN) or the Internet. Such networks may be based on any suitable technology and may operate according to any suitable protocol and may include wireless networks or wired networks.

Also, a computer may have one or more input devices and/or one or more output devices. These devices can be used, among other things, to present a user interface. Examples of output devices that may be used to provide a user interface include printers or display screens for visual presentation of output and speakers or other sound generating devices for audible presentation of output. Examples of input devices that may be used for a user interface include keyboards, and pointing devices, such as mice, touch pads, and digitizing tablets. As another example, a computer may receive input information through speech recognition or in other audible formats.

The non-transitory computer readable medium or media may be transportable, such that the program or programs stored thereon may be loaded onto one or more different computers or other processors to implement various one or more of the aspects described above. In some embodiments, computer readable media may be non-transitory media.

The terms "program," "app," and "software" are used herein in a generic sense to refer to any type of computer code or set of computer-executable instructions that may be employed to program a computer or other processor to implement various aspects as described above. Additionally, it should be appreciated that, according to one aspect, one or more computer programs that when executed perform methods of this application need not reside on a single computer or processor but may be distributed in a modular fashion among a number of different computers or processors to implement various aspects of this application.

Computer-executable instructions may be in many forms, such as program modules, executed by one or more computers or other devices. Generally, program modules include routines, programs, objects, components, data structures, etc. that performs particular tasks or implement particular abstract data types. The functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

Thus, the disclosure and claims include new and novel improvements to existing methods and technologies, which were not previously known nor implemented to achieve the useful results described above. Users of the method and system will reap tangible benefits from the functions now made possible on account of the specific modifications described herein causing the effects in the system and its outputs to its users. It is expected that significantly improved operations can be achieved upon implementation of the claimed invention, using the technical components recited herein.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

What is claimed is:

1. An automated computer-implemented method for real-time white-balance correction of digital images, comprising:

capturing an image of an agricultural field with a camera mounted on a spray boom of an agricultural spray system, the camera operably coupled to a computer in the agricultural spray system;

estimating, with the computer, a spectral power distribution of the sun based on a date and a time that the image was captured; and correcting, with the computer, a white balance of the image based, at least in part, on the spectral power distribution of the sun, a camera response function of the camera, and known red, green, and blue (RGB) intensity values of a reference white color that was illuminated by a light having a known spectral power distribution, the camera response function and the known RGB intensity values stored in computer memory operably coupled to the computer.

2. The computer-implemented method of claim 1, further comprising:

producing light with a light source mounted on the spray boom, the light produced while capturing the image, the light source operably coupled to the computer; and correcting, with the computer, the white balance of the image based, at least in part, on the spectral power distribution of the sun, a spectral power distribution of the light source, and the camera response function of the camera, the spectral power distribution of the light source stored in the computer memory.

3. The computer-implemented method of claim 1, further comprising:

after correcting the white balance of the image:

automatically analyzing, with a trained machine-learning (ML) model running on the computer, a white-balance corrected image for a presence of at least one weed, the trained ML model having been trained with first and second training images of agricultural fields, the first training images including one or more target weeds, the second training images not including the one or more target weeds;

automatically detecting, with the computer, the at least one weed in the white-balance corrected image; and automatically selectively spraying one or more of the respective regions of the agricultural field using one or more selective-spray nozzles associated with the white-balance corrected image where the at least one weed is detected, the one or more selective-spray nozzles fluidly coupled to a container holding one or more herbicides.

4. The computer-implemented method of claim 1, wherein estimating the spectral power distribution of the sun includes querying the computer memory.

5. The computer-implemented method of claim 4, further comprising querying a database or a look-up table stored in the computer memory.

6. The computer-implemented method of claim 1, further comprising:

capturing, with the camera, a plurality of outdoor images of the reference white color in an unobstructed outdoor location, each outdoor image representing a different time of day, a different date, and/or a different weather condition;

determining, with the computer, outdoor RGB intensity values of the reference white color captured in each outdoor image;

calculating, with the computer, white-balance vectors for the outdoor images, each white-balance vector including a respective ratio of the known red intensity value with respect to a respective outdoor red intensity value of a respective outdoor image, a respective ratio of the known green intensity value with respect to a respective outdoor green intensity value of the respective outdoor image, and a respective ratio of the known blue intensity value with respect to a respective outdoor blue intensity value of the respective outdoor image;

calculating, with the computer, an average white-balance vector, the average white-balance vector calculated from the calculated white-balance vectors for the outdoor images; and correcting, with the computer, the white balance of the image of the agricultural field using the average white-balance vector.

7. The computer-implemented method of claim 6, further comprising:

normalizing, with the computer, the average white-balance vector to define a normalized average white-balance vector; and correcting, with the computer, the white balance of the image of the agricultural field using the normalized average white-balance vector.

8. The computer-implemented method of claim 6, wherein the spectral power distribution of the sun is an estimated spectral power distribution (SPD), and the method further comprises:

updating the average white-balance vector using the estimated SPD and the known SPD to create an estimated average white-balance vector; and correcting, with the computer, the white balance of the image of the agricultural field using the estimated average white-balance vector.

9. The computer-implemented method of claim 8, further comprising:

calculating, with the computer, an SPD ratio of the known SPD with respect to the estimated SPD; and calculating the estimated average white-balance vector using the SPD ratio and the average white-balance vector.

* * * * *